US009834712B2

(12) United States Patent
Kapur et al.

(10) Patent No.: US 9,834,712 B2
(45) Date of Patent: *Dec. 5, 2017

(54) SEALANT COMPOSITION

(71) Applicant: Dow Global Technologies LLC, Midland, MI (US)

(72) Inventors: Mridula Kapur, Lake Jackson, TX (US); Mehmet Demirors, Pearland, TX (US); Jain Pradeep, Lake Jackson, TX (US); Joshua Gaubert, Pearland, TX (US); Douglas S. Ginger, Houston, TX (US); Mustafa Bilgen, Manvel, TX (US); Gagan Saini, Houston, TX (US); Michael D. Turner, Sugar Land, TX (US)

(73) Assignee: DOW GLOBAL TECHNOLOGIES LLC, Milwaukee, WI (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/432,222

(22) PCT Filed: Sep. 30, 2013

(86) PCT No.: PCT/US2013/062597
§ 371 (c)(1),
(2) Date: Mar. 30, 2015

(87) PCT Pub. No.: WO2014/058639
PCT Pub. Date: Apr. 17, 2014

(65) Prior Publication Data
US 2015/0259586 A1 Sep. 17, 2015

Related U.S. Application Data

(60) Provisional application No. 61/715,105, filed on Oct. 17, 2012, provisional application No. 61/711,513, filed on Oct. 9, 2012.

(51) Int. Cl.
*C08L 23/08* (2006.01)
*C08L 23/04* (2006.01)
*B32B 27/00* (2006.01)
*B23B 27/08* (2006.01)
*B32B 27/32* (2006.01)
(Continued)

(52) U.S. Cl.
CPC ............... *C09K 3/10* (2013.01); *B32B 27/08* (2013.01); *B32B 27/32* (2013.01); *B32B 27/34* (2013.01); *B32B 27/36* (2013.01); *B65D 85/70* (2013.01); *C08F 210/16* (2013.01); *B32B 2250/24* (2013.01); *B32B 2439/70* (2013.01); *C08F 4/6592* (2013.01); *C08F 2410/04* (2013.01); *C08L 23/0815* (2013.01); *C08L 2205/02* (2013.01); *C08L 2205/025* (2013.01); *C09K 2200/062* (2013.01);
(Continued)

(58) Field of Classification Search
CPC .. C08F 2500/06; C08F 210/14; C08F 210/16; C08F 2500/03; C08F 2500/08; C08F 2500/10; C08F 2500/12; C08F 2500/14; C08F 2500/16; C08F 2500/17; C08F 2500/19; C08F 2500/26; B32B 27/08; B32B 27/32; B32B 27/34; B32B 27/36; B32B 2250/24; B32B 2439/70; C08L 23/0815; C09D 123/0815; C09J 123/0815
See application file for complete search history.

(56) References Cited

U.S. PATENT DOCUMENTS 5,504,172 A 4/1996 Imuta et al.
6,525,157 B2 2/2003 Cozewith et al.
(Continued)

FOREIGN PATENT DOCUMENTS

WO 0001745 1/2000
WO 2009067337 5/2009
(Continued)

OTHER PUBLICATIONS

Chinese Office Action dated May 5, 2016; from Chinese counterpart Application No. 201380063746.0.
PCT/US2013/062597 International Search Report and Written Opinion dated Jan. 24, 2014, 8 pages.
PCT/US2013/062597 International Preliminary Report on Patentability dated Apr. 14, 2015, 6 pages.
European Patent Application No. 13779661.1 Communication under Rules 161(1) and 162 dated May 18, 2015, 9 pages.
(Continued)

*Primary Examiner* — Kregg Brooks
(74) *Attorney, Agent, or Firm* — Husch Blackwell LLP

(57) ABSTRACT

The instant invention provides a polyolefin composition suitable for sealant applications, sealant compositions, method of producing the same, and films and multilayer structures made therefrom. The polyolefin composition suitable for sealant applications according to the present invention comprises: an ethylene/α-olefin interpolymer composition having a Comonomer Distribution Constant (CDC) in the range of from 40 to 110, vinyl unsaturation of less than 0.1 vinyls per one thousand carbon atoms present in the backbone of the ethylene-based polymer composition; a zero shear viscosity ratio (ZSVR) in the range of from 1.01 to 2.0; a density in the range of from 0.908 to 0.922 g/cm$^3$, a melt index ($I_2$ at 190° C./2.16 kg) in the range of from 0.5 to 5.0 g/10 minutes, a molecular weight distribution (defined as the weight average molecular weight divided by the number average molecular weight, $M_w/M_n$) in the range of from 2.0 to 4.0, and tan delta at 0.1 radian/second, determined at 190° C., in the range of from 5 to 50.

6 Claims, 10 Drawing Sheets

(51) Int. Cl.
  *B32B 27/34* (2006.01)
  *B32B 27/36* (2006.01)
  *B65D 85/00* (2006.01)
  *C08F 210/16* (2006.01)
  *C08J 5/18* (2006.01)
  *C08J 5/00* (2006.01)
  *C09K 3/10* (2006.01)
  *B32B 27/08* (2006.01)
  *C08F 4/6592* (2006.01)

(52) U.S. Cl.
  CPC .................. *Y10T 428/31757* (2015.04); *Y10T 428/31797* (2015.04); *Y10T 428/31913* (2015.04)

(56) References Cited

U.S. PATENT DOCUMENTS

| | | | |
|---|---|---|---|
| 6,953,764 | B2 | 10/2005 | Frazier et al. |
| 6,960,635 | B2 | 11/2005 | Stevens et al. |
| 9,115,275 | B2 * | 8/2015 | Kupar ............... C07F 7/184 |
| 2006/0199030 | A1 | 9/2006 | Liang et al. |
| 2010/0285253 | A1 | 11/2010 | Hughes et al. |
| 2011/0172354 | A1 † | 7/2011 | Claasen |
| 2015/0132514 | A1 * | 5/2015 | Wang ............... B29C 47/0026 428/35.7 |
| 2015/0225520 | A1 * | 8/2015 | Bensason ............... C08J 5/18 526/348.1 |
| 2015/0299440 | A1 * | 10/2015 | Wang ............... B29C 47/0026 428/35.2 |

FOREIGN PATENT DOCUMENTS

| | | | |
|---|---|---|---|
| WO | 2011/002986 | † | 1/2011 |
| WO | 2011109563 | | 9/2011 |
| WO | 2011/159376 | † | 12/2011 |
| WO | 2012/061168 | † | 5/2012 |
| WO | 2012061168 | | 5/2012 |
| WO | 2014003926 | | 1/2014 |

OTHER PUBLICATIONS

EP Response to Office Action dated Nov. 13, 2015; from EP counterpart Application No. 13779661.1.
Saudi Arabia Office Action dated Jan. 7, 2016; from Saudi Arabia counterpart Application No. 515360252.
Chinese Response to Office Action dated Oct. 2, 2016; from Chinese counterpart Application No. 201380063746.0.
Saudi Arabia Office Action dated Jan. 28, 2016; from counterpart Suadia Arabian Application No. 515360252.
Karjala et al., "Detection of Low Levels of Long-Chain Branching in Polyolefins", ANTEC (2008) pp. 887-891.†

* cited by examiner
† cited by third party

```
;lc1prf2_zz prosol relations=<lcnmr> include <Avance.incl>

"d12=20u"
"d11=4u"

1 ze
  d12 pl21:f2
2 30m
  d13
  d12 pl9:f1
  d1 cw:f1 ph29 cw:f2 ph29
  d11 do:f1 do:f2
  d12 pl1:f1
  p1 ph1
  go=2 ph31
  30m mc #0 to 2 F0(zd)
exit ph1=0 2 2 0 1 3 3 1
ph29=0
ph31=0 2 2 0 1 3 3 1
```

SEALANT COMPOSITION

REFERENCE TO RELATED APPLICATIONS

This application is a 371 National Phase Application of PCT/US2013/062597, filed Sep. 30, 2013; which claims priority to U.S. Provisional Application No. 61/711,513, filed Oct. 9, 2012, and U.S. Provisional Application No. 61/715,105, filed Oct. 17, 2012; the entire contents of which are hereby incorporated herein by reference.

FIELD OF INVENTION

The instant invention relates to a polyolefin composition suitable for sealant applications, sealant compositions, method of producing the same, and films and multilayer structures made therefrom.

BACKGROUND OF THE INVENTION

The use of polyolefin compositions in sealant applications is generally known. Any conventional method may be employed to produce such polyolefin compositions.

Various polymerization techniques using different catalyst systems have been employed to produce such polyolefin compositions suitable for sealant applications.

Despite the research efforts in developing sealant compositions, there is still a need for a sealant composition having a good balance of stiffness, toughness, optical properties such as low haze, and improved sealant properties such as high hot tack strength, high seal strength, and substantially free of seal leakage, while facilitating improved film fabrication. Additionally, there is a need for a method to produce such sealant composition having balanced stiffness, toughness, optical properties such as low haze, and improved sealant properties such as high hot tack strength, high seal strength, and substantially free of seal leakage, while facilitating improved film fabrication.

SUMMARY OF THE INVENTION

The instant invention provides a polyolefin composition suitable for sealant applications, sealant compositions, method of producing the same, and films and multilayer structures made therefrom.

In one embodiment, the instant invention provides a polyolefin composition suitable for sealant applications comprising: an ethylene/α-olefin interpolymer composition having a Comonomer Distribution Constant (CDC) in the range of from 40 to 110, vinyl unsaturation of less than 0.1 vinyls per one thousand carbon atoms present in the backbone of the ethylene-based polymer composition; a zero shear viscosity ratio (ZSVR) in the range of from 1.01 to 2.0; a density in the range of from 0.908 to 0.922 g/cm$^3$, a melt index (I$_2$ at 190° C./2.16 kg) in the range of from 0.5 to 5.0 g/10 minutes, a molecular weight distribution (defined as the weight average molecular weight divided by the number average molecular weight, M$_w$/M$_n$) in the range of from 2.0 to 4.0, and tan delta at 0.1 radian/second, determined at 190° C., in the range of from 5 to 50.

In another embodiment, the instant invention provides a sealant composition comprising: a polyolefin composition suitable for sealant applications comprising an ethylene/α-olefin interpolymer composition having a Comonomer Distribution Constant (CDC) in the range of from 40 to 110, vinyl unsaturation of less than 0.1 vinyls per one thousand carbon atoms present in the backbone of the ethylene-based polymer composition; a zero shear viscosity ratio (ZSVR) in the range of from 1.01 to 2.0; a density in the range of from 0.908 to 0.922 g/cm$^3$, a melt index (I$_2$ at 190° C./2.16 kg) in the range of from 0.5 to 5.0 g/10 minutes, a molecular weight distribution (defined as the weight average molecular weight divided by the number average molecular weight, M$_w$/M$_n$) in the range of from 2.0 to 4.0, and tan delta at 0.1 radian/second, determined at 190° C., in the range of from 5 to 50.

In another embodiment, the instant invention provides a film comprising the inventive sealant composition, as described above.

In another embodiment, the instant invention provides a multilayer structure comprising one or more film layers comprising the sealant composition, as described above.

In an alternative embodiment, the instant invention provides a multilayer structure, in accordance with any of the preceding embodiments, except that the multilayer structure further comprises one or more layers selected from the group consisting of one or more polyamides, one or more polyesters, one or more polyolefins, and combinations thereof.

In another embodiment, the instant invention provides a sealant composition, in accordance with any of the preceding embodiments, except that the sealant composition further comprises one or more ethylene polymers, or one or more propylene based polymers, or combinations thereof.

In an alternative embodiment, the instant invention provides a polyolefin composition, method of producing the same, sealant composition made therefrom, films and multilayer structure made therefrom, in accordance with any of the preceding embodiments, except that the polyolefin composition is characterized by at least two of the followings:

a. having a Dart impact B of at least 500 g, measured according to ASTM D1709, when said polyolefin composition is formed into a monolayer blown film having a thickness of 1 mil;

b. having a normalized machine direction Elmendorf tear of at least 195 g/mil, measured according to ASTM D1922, when said polyolefin composition is formed into a monolayer blown film having a thickness of 1 mil;

c. having a 2% secant modulus in the machine direction of at least 16,000 psi, measured according to ASTM D882, when polyolefin composition is formed into a monolayer blown film having a thickness of 1 mil;

d. having a total haze of less than or equal to 10%, measured according to ASTM D1003, when said polyolefin composition is formed into a monolayer blown film having a thickness of 1 mil.

In an alternative embodiment, the instant invention provides a polyolefin composition, method of producing the same, sealant composition made therefrom, films and multilayer structure made therefrom, in accordance with any of the preceding embodiments, except that the sealant composition has a hot tack strength at 130° C. of greater than 11 N/inch, measured according to ASTM F1921, when said sealant composition is formed into a three layer coextruded blown film and subsequently laminated to a 0.5 mil PET substrate.

In an alternative embodiment, the instant invention provides a polyolefin composition, method of producing the same, sealant composition made therefrom, films and multilayer structure made therefrom, in accordance with any of the preceding embodiments, except that the sealant composition has a moon resistance in the range of equal or greater than 600 g.

In an alternative embodiment, the instant invention provides a polyolefin composition, method of producing the same, sealant composition made therefrom, films and multilayer structure made therefrom, in accordance with any of the preceding embodiments, except that the films and multilayer structures are used as packaging devices.

In an alternative embodiment, the instant invention provides a packaging device, in accordance with any of the preceding embodiments, except that the packaging device comprises the multilayer structure, as described above.

In an alternative embodiment, the instant invention provides a packaging device, in accordance with any of the preceding embodiments, except that the packaging device is used for food packaging.

In an alternative embodiment, the instant invention provides a polyolefin composition, method of producing the same, sealant composition made therefrom, films and multilayer structure made therefrom, in accordance with any of the preceding embodiments, except that the polyolefin composition has a ZSVR in the range of from 1.12 to 2.0.

In an alternative embodiment, the instant invention provides a polyolefin composition, method of producing the same, sealant composition made therefrom, films and multilayer structure made therefrom, in accordance with any of the preceding embodiments, except that the polyolefin composition has a melt strength expressed as the steady state force greater than 2.3 cN at a Velocity of 8 mm/s measured at 190° C.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 7 illustrates the modified pulse sequences for unsaturation with Bruker AVANCE 400 MHz spectrometer.

DETAILED DESCRIPTION OF THE INVENTION

Figure 1:
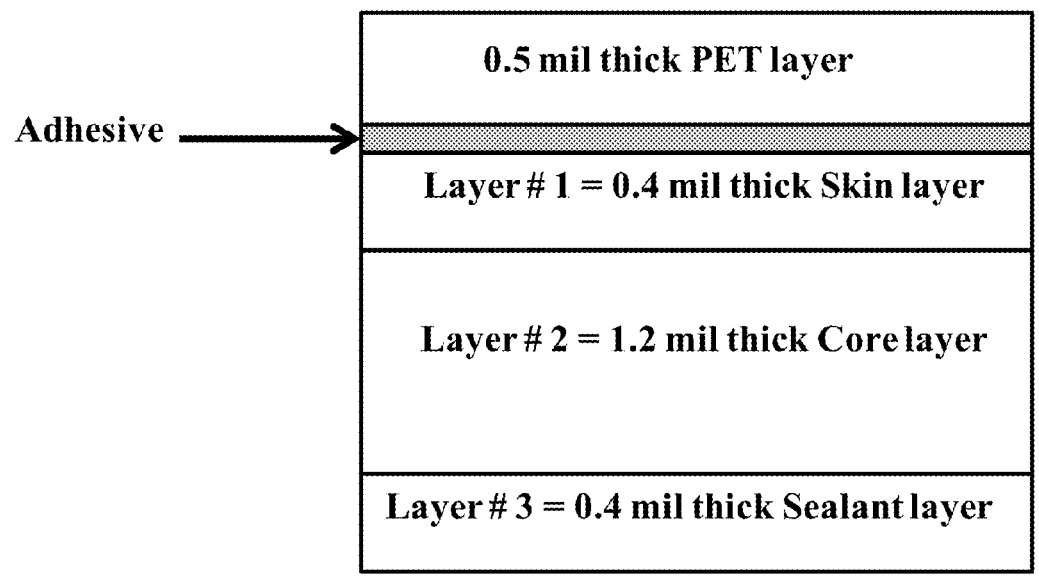
FIG. 1 illustrates an exemplary three layer co-extruded laminate film structure.

The instant invention provides a polyolefin composition suitable for sealant applications, sealant compositions, method of producing the same, and films and multilayer structures made therefrom.

In one embodiment, the instant invention provides a polyolefin composition suitable for sealant applications comprising: an ethylene/α-olefin interpolymer composition having a Comonomer Distribution Constant (CDC) in the range of from 40 to 110, vinyl unsaturation of less than 0.1 vinyls per one thousand carbon atoms present in the backbone of the ethylene-based polymer composition; a zero shear viscosity ratio (ZSVR) in the range of from 1.01 to 2.0; a density in the range of from 0.908 to 0.922 g/cm$^3$, a melt index ($I_2$ at 190° C./2.16 kg) in the range of from 0.5 to 5.0 g/10 minutes, a molecular weight distribution (defined as the weight average molecular weight divided by the number average molecular weight, $M_w/M_n$) in the range of from 2.0 to 4.0, and tan delta at 0.1 radian/second, determined at 190° C., in the range of from 5 to 50.

In another embodiment, the instant invention provides a sealant composition comprising: a polyolefin composition suitable for sealant applications comprising an ethylene/α-olefin interpolymer composition having a Comonomer Distribution Constant (CDC) in the range of from 40 to 110, vinyl unsaturation of less than 0.1 vinyls per one thousand carbon atoms present in the backbone of the ethylene-based polymer composition; a zero shear viscosity ratio (ZSVR) in the range of from 1.01 to 2.0; a density in the range of from 0.908 to 0.922 g/cm$^3$, a melt index ($I_2$ at 190° C./2.16 kg) in the range of from 0.5 to 5.0 g/10 minutes, a molecular weight distribution (defined as the weight average molecular weight divided by the number average molecular weight, $M_w/M_n$) in the range of from 2.0 to 4.0, and tan delta at 0.1 radian/second, determined at 190° C., in the range of from 5 to 50.

The polyolefin composition may further comprise additional components such as one or more other polymers. For example the polyolefin composition may further comprise one or more ethylene polymers, or one or more propylene based polymers, or combinations thereof.

In one embodiment, the polyolefin composition may further comprise a propylene/α-olefin interpolymer composition.

In one embodiment, one or more ethylene/α-olefin interpolymer compositions and one or more propylene/α-olefin interpolymer compositions, as described herein, may be blended via any method known to a person of ordinary skill in the art including, but not limited to, dry blending, and melt blending via any suitable equipment, for example, an extruder, to produce the inventive sealant composition.

In one embodiment, the polyolefin composition may comprise from 85 to 100 percent by weight of the ethylene/α-olefin interpolymer composition, for example from 85 to 97.5 percent by weight of the ethylene/α-olefin interpolymer composition, based on the weight of the polyolefin composition. In one embodiment, the polyolefin composition may comprise from 0 to 15 percent by weight of one or more propylene/α-olefin interpolymer compositions, for example from 2.5 to 15 percent by weight of one or more propylene/α-olefin interpolymer compositions, based on the weight of the polyolefin composition.

The polyolefin composition may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, processing aids, UV stabilizers, anti-blocks, slip agents, tackifiers, fire retardants, anti-microbial agents, odor reducer agents, anti-fungal agents, and combinations thereof. The ethylene-based polymer composition may contain from about 0.01 to about 10 percent by the combined weight of such additives, based on the weight of the ethylene-based polymer composition including such additives.

Ethylene/α-olefin Interpolymer Composition

The ethylene/α-olefin interpolymer composition comprises (a) less than or equal to 100 percent, for example, at least 70 percent, or at least 80 percent, or at least 90 percent, of the units derived from ethylene; and (b) less than 30 percent, for example, less than 25 percent, or less than 20 percent, or less than 10 percent, by weight of units derived from one or more α-olefin comonomers. The term "ethylene/α-olefin interpolymer composition" refers to a polymer that contains more than 50 mole percent polymerized ethylene monomer (based on the total amount of polymerizable monomers) and, optionally, may contain at least one comonomer.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The ethylene/α-olefin interpolymer composition is characterized by having a Comonomer Distribution Constant in the range of from 40 to 200, for example from 40 to 150, or from 40 to 110.

The ethylene-based polymer composition is characterized by having a zero shear viscosity ratio (ZSVR) in the range of from 1.01 to 2.0, for example, from 1.12 to 2.0.

The ethylene-based polymer composition is characterized by having a tan delta at 0.1 radian/second, determined at 190° C., in the range of from 5 to 50, for example from 5 to 45, or from 5 to 40.

The ethylene/α-olefin interpolymer composition has a density in the range of 0.908 to 0.922 g/cm$^3$, for example from 0.908 to 0.920 g/cm$^3$. For example, the density can be from a lower limit of 0.908, 0.909, or 0.910 g/cm$^3$ to an upper limit of 0.918, 0.919, 0.920, or 0.922 g/cm$^3$.

The ethylene/α-olefin interpolymer composition has a molecular weight distribution ($M_w/M_n$) in the range of from 2.0 to 4.0. For example, the molecular weight distribution ($M_w/M_n$) can be from a lower limit of 2.0, 2.1, or 2.2 to an upper limit of 3.8, 3.9, or 4.0.

The ethylene/α-olefin interpolymer composition has a melt index ($I_2$ at 190° C./2.16 kg) in the range of from 0.5 to 5.0 g/10 minutes, for example from 0.5 to 4.5 g/10 minutes, or from 0.5 to 4.0 g/10 minutes, or from 0.5 to 3.5 g/10 minutes, or from 0.5 to 3.0 g/10 minutes, or from 0.5 to 2.5 g/10 minutes, or from 0.5 to 2.0 g/10 minutes, or from 0.5 to 1.8 g/10 minutes, or 0.6 to 1.6 g/10 minutes. For example, the melt index ($I_2$ at 190° C./2.16 kg) can be from a lower limit of 0.5, 0.6, or 0.7 g/10 minutes to an upper limit of 1.6, 1.7, 1.8, 1.9, 2.0, 2.5, 3.0, 3.5, 4.0, 4.5, or 5.0 g/10 minutes.

The ethylene/α-olefin interpolymer composition has vinyl unsaturation of less than 0.15, for example less than 0.12, or less than 0.1 vinyls per one thousand carbon atoms present in the backbone of the ethylene-based polymer composition.

The polyolefin composition has a melt strength expressed as the steady state force greater than 2.3 cN at a Velocity of 8 mm/s measured at 190° C.

The ethylene/α-olefin interpolymer composition may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, processing aids, UV stabilizers, anti-blocks, slip agents, tackifiers, fire retardants, anti-microbial agents, odor reducer agents, anti-fungal agents, and combinations thereof. The ethylene-based polymer composition may contain from about 0.1 to about 10 percent by the combined weight of such additives, based on the weight of the ethylene-based polymer composition including such additives.

In one embodiment, ethylene/α-olefin interpolymer composition has a comonomer distribution profile comprising a monomodal distribution or a bimodal distribution in the temperature range of from 35° C. to 120° C., excluding purge.

Any conventional polymerization processes may be employed to produce the ethylene/α-olefin interpolymer composition. Such conventional polymerization processes include, but are not limited to, solution polymerization process, using one or more conventional reactors e.g. loop reactors, isothermal reactors, stirred tank reactors, batch reactors in parallel, series, and/or any combinations thereof.

The ethylene/α-olefin interpolymer composition may, for example, be produced via solution phase polymerization process using one or more loop reactors, isothermal reactors, and combinations thereof.

In general, the solution phase polymerization process occurs in one or more well-stirred reactors such as one or more loop reactors or one or more spherical isothermal reactors at a temperature in the range of from 115 to 250° C.; for example, from 115 to 200° C., and at pressures in the range of from 300 to 1000 psi; for example, from 400 to 750 psi. In one embodiment in a dual reactor, the temperature in the first reactor is in the range of from 115 to 190° C., for example, from 115 to 150° C., and the second reactor temperature is in the range of 150 to 200° C., for example, from 170 to 195° C. In another embodiment in a single reactor, the temperature in the reactor is in the range of from 115 to 190° C., for example, from 115 to 150° C. The residence time in solution phase polymerization process is typically in the range of from 2 to 30 minutes; for example, from 10 to 20 minutes. Ethylene, solvent, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Tex. The resultant mixture of the ethylene/alpha-olefin interpolymer and solvent is then removed from the reactor and the ethylene/alpha-olefin interpolymer is isolated. Solvent is typically recovered via a solvent recovery unit, i.e. heat exchangers and vapor liquid separator drum, and is then recycled back into the polymerization system.

In one embodiment, the ethylene/α-olefin interpolymer composition may be produced via solution polymerization in a dual reactor system, for example a dual loop reactor system, wherein ethylene and optionally one or more α-olefins are polymerized in the presence of one or more catalyst systems. Additionally, one or more cocatalysts may be present.

In another embodiment, the ethylene/alpha-olefin interpolymers may be produced via solution polymerization in a single reactor system, for example a single loop reactor system, wherein ethylene and optionally one or more α-olefins are polymerized in the presence of one or more catalyst systems.

An exemplary catalyst system comprises a metal complex of a polyvalent aryloxyether in the single loop reactor system, wherein said metal complex of a polyvalent aryloxyether corresponds to the formula:

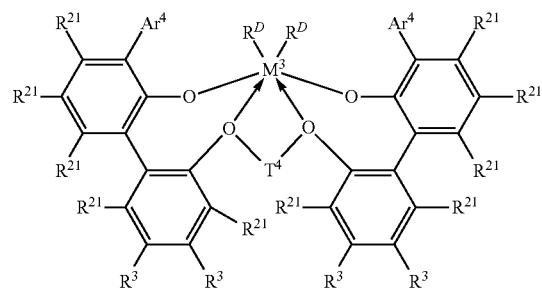

where $M^3$ is Ti, Hf or Zr, preferably Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence is hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group. Additionally, one or more cocatalysts may be present.

Another exemplary catalyst system comprises a polyvalent heteroatom ligand group-containing metal complex, especially polyvalent pyridylamine or imidizolylamine based complexes and tetradendate oxygen-ligated biphenyl-phenol based Group 4 metal complexes. Suitable metal complexes for use according to the present invention include compounds corresponding to the formula:

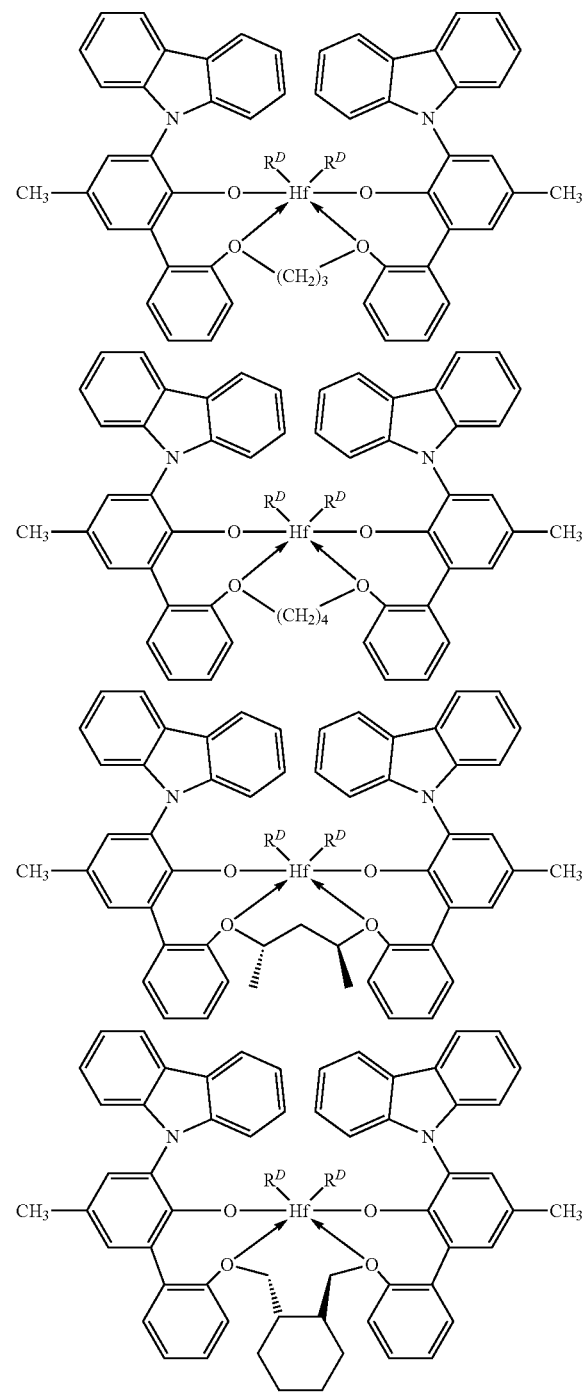

wherein, $R^D$ independently each occurrence is chloro, methyl or benzyl. Specific examples of suitable metal complexes are the following compounds: bis((2-oxoyl-3-(dibenzo-1H-pyrrole-1-yl)-5-(methyl)phenyl)-2-phenoxy)-1,3-propanediylhafnium (IV) dimethyl, and bis((2-oxoyl-3-(dibenzo-1H-pyrrole-1-yl)-5-(methyl)phenyl)-2-phenoxymethyl)-methylenetrans-1,2-cyclohexanediylhafnium (IV) dimethyl.

Another exemplary catalyst system comprises a 2-[N-(2,6-diisopropylphenylamido)-o-isopropylphenylmethyl]-6-(2-η-1-naphthyl)-pyridyl hafnium (IV) dimethyl catalyst system, further described in U.S. Pat. No. 6,953,764, incorporated herein by reference, and having a structure according to the following formula:

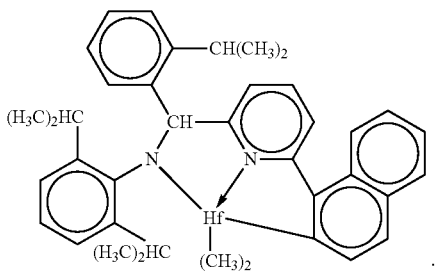

Another exemplary catalyst system comprises a constrained geometry catalyst represented by the following formula:

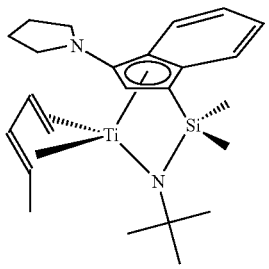

In one embodiment the constrained geometry catalyst is (N-(1,1-dimethylethyl)-1,1-dimethyl-1-((1,2,3,3a,7a-h)-3-(1-pyrrolidinyl)-H-inden-1-yl) silanaminato(2-)-N)((2,3,4,5-h)-2,4-pentadiene)titanium, represented by the formula above.

Another exemplary catalyst system may comprise a Ziegler-Natta catalyst system.

Propylene/α-olefin Interpolymer Compositions

The propylene/α-olefin interpolymer composition comprises a propylene/alpha-olefin copolymer and/or a propylene/ethylene/butene terpolymer, and, optionally, may further comprise one or more polymers, e.g., a random copolymer polypropylene (RCP, heterogeneously branched).

The polyolefin composition may comprise from 0 to 15 percent by weight of the one or more propylene/α-olefin interpolymer compositions, for example from 2.5 to 15 percent by weight of the one or more propylene/α-olefin interpolymer compositions, based on the weight of the polyolefin composition.

In one particular embodiment, the propylene/alpha-olefin copolymer is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by $^{13}$C NMR spectra.

The propylene/α-olefin copolymer may have a melt flow rate in the range of from 0.1 to 30 g/10 minutes, measured in accordance with ASTM D1238 (at 230° C./2.16 kg). All individual values and sub-ranges from 0.1 to 30 g/10 minutes are included herein and disclosed herein; for example, the melt flow rate can be from a lower limit of 0.1 g/10 minutes, 0.2 g/10 minutes, 0.5 g/10 minutes, or 1 g/10 minutes to an upper limit of 30 g/10 minutes, or 25 g/10 minutes, or 20 g/10 minutes, or 15 g/10 minutes, or 10 g/10 minutes. For example, the propylene/α-olefin copolymer may have a melt flow rate in the range of from 0.1 to 25 g/10 minutes; or in the alternative, the propylene/α-olefin copolymer may have a melt flow rate in the range of from 1 to 20 g/10 minutes; or in the alternative, the propylene/a olefin copolymer may have a melt flow rate in the range of from 1 to 10 g/10 minutes; or in the alternative, the propylene/α-olefin copolymer may have a melt flow rate in the range of from 1 to 5 g/10 minutes; or in the alternative, the propylene/α-olefin copolymer may have a melt flow rate in the range of from 1 to 3 g/10 minutes.

The propylene/alpha-olefin copolymer has a crystallinity in the range of from at least 1 percent by weight (a heat of fusion of at least 2 Joules/gram) to 45 percent by weight (a heat of fusion of less than 75 Joules/g). All individual values and sub-ranges from 1 percent by weight (a heat of fusion of at least 2 Joules/gram) to 45 percent by weight (a heat of fusion of less than 75 Joules/g) are included herein and disclosed herein; for example, the crystallinity can be from a lower limit of 1 percent by weight (a heat of fusion of at least 2 Joules/g), 2.5 percent (a heat of fusion of at least 4 Joules/g), or 3 percent (a heat of fusion of at least 5 Joules/g), or 10 percent (a heat of fusion of at least 16.5 Joules/g), or 15 percent (a heat of fusion of at least 24.8 Joules/g) to an upper limit of 45 percent by weight (a heat of fusion of less than 75 Joules/g), 35 percent by weight (a heat of fusion of less than 57.8 Joules/g), or 30 percent by weight (a heat of fusion of less than 50 Joules/g). For example, the propylene/alpha-olefin copolymer may have a crystallinity in the range of from at least 10 percent by weight (a heat of fusion of at least 16.5 Joules/g) to 45 percent by weight (a heat of fusion of less than 75 Joules/g); or in the alternative, the propylene/alpha-olefin copolymer may have a crystallinity in the range of from at least 15 percent by weight (a heat of fusion of at least 24.8 Joules/g) to 35 percent by weight (a heat of fusion of less than 57.8 Joules/g. The crystallinity is measured via DSC method, using the $2^{nd}$ heat cycle. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of one or more alpha-olefin comonomers. All individual values and sub ranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers; or in the alternative, the propylene/alpha-olefin copolymer comprises from 3 to 9 percent by weight of one or more alpha-olefin comonomers.

The propylene/alpha-olefin copolymer has a molecular weight distribution (MWD), defined as the weight average molecular weight divided by the number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the trade name VERSIFY™, or from ExxonMobil Chemical Company, under the trade name VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches at least seven (7) carbons in length, but these backbones also have short chain branches of only six (6) carbons in length. Such propylene/alpha-olefin copolymers are further described in details in the U.S. Patent Publication No. 2010-0285253 and International Patent Publication No. WO 2009/067337, each of which is incorporated herein by reference.

The propylene/alpha-olefin interpolymer composition may further comprise one or more additives. Such additives include, but are not limited to, antistatic agents, color enhancers, dyes, lubricants, fillers, pigments, primary antioxidants, secondary antioxidants, processing aids, UV stabilizers, and combinations thereof. The propylene/alpha-olefin interpolymer composition may contain any amounts of additives. The propylene/alpha-olefin composition may compromise from about 0 to about 20 percent by the combined weight of such additives, based on the weight of the propylene/alpha-olefin interpolymer composition and the one or more additives.

Additional Ethylene-α-olefin Interpolymer

In one embodiment, the sealant composition may further comprise an additional ethylene-α-olefin interpolymer component. In one embodiment, one or more ethylene/α-olefin interpolymer compositions are one or more very low density polyethylene (VLDPE) compositions, as described herein, may be blended via any method known to a person of ordinary skill in the art including, but not limited to, dry blending, and melt blending via any suitable equipment, for example, an extruder, to produce the inventive sealant composition. The VLDPE is characterized as a very low density, linear, heterogeneously branched ethylene-α-olefin interpolymer with a density of less than 0.912 g/cm$^3$, for example from 0.890 to 0.904 g/cm$^3$; or in the alternative form 0.890 to 0.900 g/cm$^3$; 0.896 to 0.900 g/cm$^3$, and a melt index ($I_2$ at 190° C./2.16 kg) in the range of from 0.25 to 10 g/10 minutes, for example, from 0.25 to 8 g/10 minutes; and a molecular weight distribution (Mw/Mn) in the range of from 2.5 to 4.0. Such VLDPE may be produced via heterogeneous Ziegler-Natta catalyst systems. VLDPE can be added to the polyolefin composition as a reactor blend or physical blend.

Process for Producing the Polyolefin Composition

One or more ethylene/α-olefin interpolymer compositions, optionally one or more propylene/alpha-olefin interpolymer compositions, optionally one or more additional ethylene-α-olefin interpolymer compositions, as described herein, may be blended via any method known to a person of ordinary skill in the art including, but not limited to, dry blending, and melt blending via any suitable equipment, for example, an extruder, to produce the inventive polyolefin composition.

End-Use Applications of the Sealant Composition

The polyolefin compositions according to the present invention may be used in any sealing applications, for example, food packaging applications such as sliced cheese, snacks, and frozen food packaging.

The sealant compositions according to the present invention may be formed into a film, a sheet, or a multilayer structure. Such multilayer structures typically comprise one or more film layers or sheets comprising the inventive sealant compositions. The multilayer structure may further comprise one or more layers comprising one or more polyamides, one or more polyesters, one or more polyolefins, and combinations thereof.

Inventive polyolefin compositions according to the present invention are characterized by two or more of the followings: (a) having a Dart B impact of at least 500 g, measured according to ASTM D1709, when the polyolefin composition is formed into a monolayer blown film having a thickness of 1 mil; (b) having a normalized machine direction Elmendorf tear of at least 195 g/mil, measured according to ASTM D1922, when the polyolefin composition is formed into a monolayer blown film having a thickness of 1 mil; (c) having a 2% secant modulus in the machine direction of at least 16,000 psi, measured according to ASTM D882, when the polyolefin composition is formed into a monolayer blown film having a thickness of 1 mil; (d) having a total haze of less than or equal to 10%, measured according to ASTM D1003, when the polyolefin composition is formed into a monolayer blown film having a thickness of 1 mil.

The sealant composition according to present invention has a hot tack strength at 130° C. of greater than 11 N/inch, for example in the range of from 19 to 30 N/inch measured according to ASTM F1921, when the sealant composition is formed into a three layer coextruded blown film and subsequently laminated to a 0.5 mil PET substrate.

The sealant composition according to present invention has moon resistance equal or greater than 600 g, for example from 900 to 1100 g.

EXAMPLES

The following examples illustrate the present invention but are not intended to limit the scope of the invention. The sealant compositions of the present invention have shown to have a good balance of stiffness, toughness, optical properties such as low haze, and improved sealant properties such as high hot tack strength, high seal strength, and substantially free of seal leakage, while facilitating improved film fabrication.

Inventive Polyolefin Composition 1

Inventive polyolefin composition 1 (IPC1) comprises an ethylene-octene interpolymer having a density of approximately 0.913 g/cm$^3$, a melt index (I$_2$), measured at 190° C. and 2.16 kg, of approximately 0.81 g/10 minutes, an melt flow ratio (I$_{10}$/I$_2$) of approximately 6.7. Additional properties of IPC1 were measured, and are reported in Table 1A.

IPC1 was prepared via solution polymerization in a dual loop reactor system in the presence of a Hafnium based catalyst system in the first reactor and a constrained geometry catalyst system in the second reactor;

wherein the Hafnium based catalyst comprises a 2-[N-(2,6-diisopropylphenylamido)-o-isopropylphenylmethyl]-6-(2-η-1-naphthyl)-pyridyl hafnium(IV)dimethyl catalyst system, further described in U.S. Pat. No. 6,953,764, incorporated herein by reference, and having a structure according to the following formula:

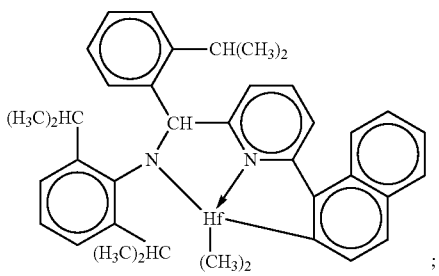

and wherein constrained geometry catalyst comprises (N-(1,1-dimethylethyl)-1,1-dimethyl-1-((1,2,3,3a,7a-h)-3-(1-pyrrolidinyl)-1H-inden-1-yl)silanaminato(2-)-N)((2,3,4,5-h)-2,4-pentadiene)titanium; represented by the following formula:

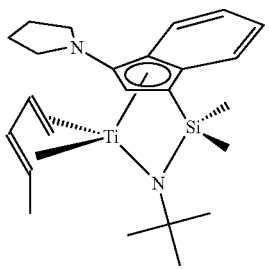

The polymerization conditions for IPC1 are reported in Table 2A. Referring to Table 2A, MMAO is modified methyl aluminoxane; and RIBS-2 is bis(hydrogenated tallow alkyl) methyl, tetrakis(pentafluorophenyl)borate(1-) amine, used as cocatalysts.

Inventive Polyolefin Composition 2

Inventive polyolefin composition 2 (IPC2) comprises an ethylene-octene interpolymer, having a density of approximately 0.913 g/cm$^3$, a melt index (I$_2$), measured at 190° C. and 2.16 kg, of approximately 0.84 g/10 minutes, an melt flow ratio (I$_{10}$/I$_2$) of approximately 6.6. Additional properties of IPC2 were measured, and are reported in Table 1A.

IPC2 was prepared via solution polymerization in a dual loop reactor system in the presence of a Zirconium based catalyst system in both first and second reactor, wherein the Zirconium based catalyst system comprises [2,2'''-[1,3-propanediylbis(oxy-κO)]bis[3'',5,5''-tris(1,1-dimethylethyl)-5'-methyl[1,1:3',1''-terphenyl]-2'-olato-κO]]dimethyl-, (OC-6-33)-Zirconium, represented by the following formula:

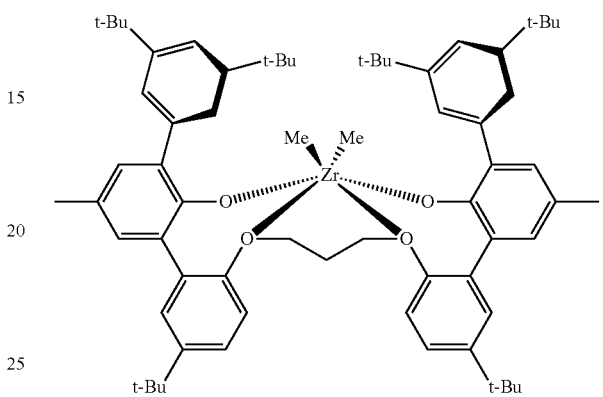

The polymerization conditions for IPC2 are reported in Table 2A. Referring to Table 2A, MMAO is modified methyl aluminoxane; and RIBS-2 is bis(hydrogenated tallow alkyl) methyl, tetrakis(pentafluorophenyl)borate(1-)amine, used as cocatalysts.

Inventive Polyolefin Composition 3

Inventive polyolefin composition 3 (IPC3) comprises an ethylene-octene interpolymer, having a density of approximately 0.912 g/cm$^3$, a melt index (I$_2$), measured at 190° C. and 2.16 kg, of approximately 0.81 g/10 minutes, an melt flow ratio (I$_{10}$/I$_2$) of approximately 6.2. Additional properties of IPC3 were measured, and are reported in Table 1A.

IPC3 was prepared via solution polymerization in a dual loop reactor system in the presence of a Hafnium based catalyst system in both first and second reactor, wherein the hafnium based catalyst system comprises bis((2-oxoyl-3-(dibenzo-1H-pyrrole-1-yl)-5-(methyl)phenyl)-2-phenoxymethyl)-methylenetrans-1,2-cyclohexanediylhafnium (IV)dimethyl, represented by the following formula:

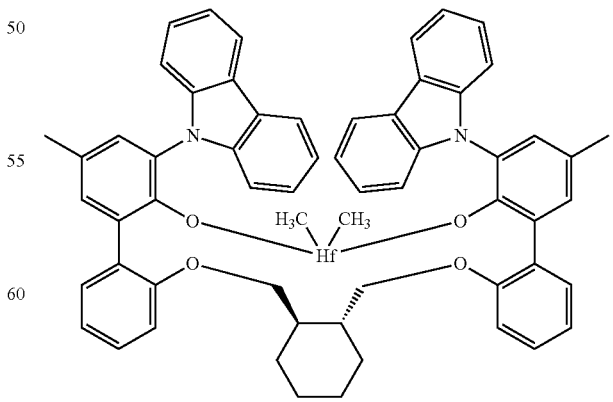

The polymerization conditions for IPC3 are reported in Table 2A. Referring to Table 2A, MMAO is modified methyl aluminoxane; and RIBS-2 is bis(hydrogenated tallow alkyl) methyl, tetrakis(pentafluorophenyl)borate(1-)amine, used as cocatalysts.

Inventive Polyolefin Composition 4

Inventive polyolefin composition 4 (IPC4) comprises an ethylene-octene interpolymer, having a density of approximately 0.913 g/cm$^3$, a melt index ($I_2$), measured at 190° C. and 2.16 kg, of approximately 0.8 g/10 minutes, an melt flow ratio ($I_{10}/I_2$) of approximately 6.3. Additional properties of IPC4 were measured, and are reported in Table 1B.

IPC4 was prepared via solution polymerization in a dual loop reactor system in the presence of a Hafnium based catalyst system in the first reactor and a Zirconium based catalyst system in second reactor;

wherein the Hafnium based catalyst comprises a 2-[N-(2,6-diisopropylphenylamido)-o-isopropylphenylmethyl]-6-(2-η-1-naphthyl)-pyridyl hafnium(IV)dimethyl catalyst system, further described in U.S. Pat. No. 6,953,764, incorporated herein by reference, and having a structure according to the following formula:

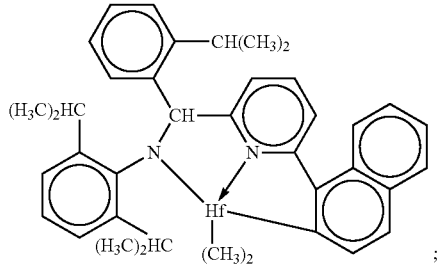

and wherein the Zirconium based catalyst system comprises [2,2'''-[1,3-propanediylbis(oxy-κO)]bis[3'',5,5''-tris(1,1-dimethylethyl)-5'-methyl[1,1':3',1''-terphenyl]-2'-olato-κO]] dimethyl-, (OC-6-33)-Zirconium, represented by the following formula:

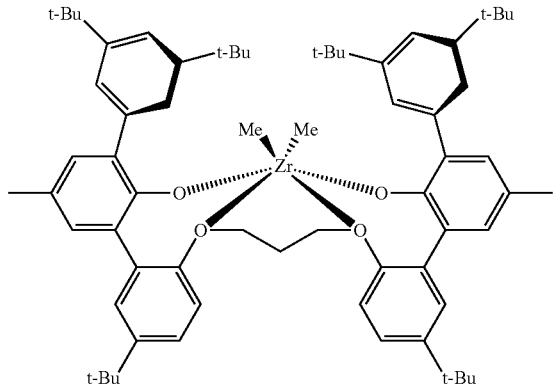

The polymerization conditions IPC4 is reported in Tables 2B. Referring to Table 2B, MMAO is modified methyl aluminoxane; and RIBS-2 is bis(hydrogenated tallow alkyl) methyl, tetrakis(pentafluorophenyl)borate(1-) amine, used as cocatalysts.

Inventive Polyolefin Composition 5

Inventive polyolefin composition 5 (IPC5) comprises an ethylene-octene interpolymer, having a density of approximately 0.913 g/cm$^3$, a melt index ($I_2$), measured at 190° C. and 2.16 kg, of approximately 0.9 g/10 minutes, an melt flow ratio ($I_{10}/I_2$) of approximately 7.2. Additional properties of IPC5 were measured, and are reported in Table 1B.

IPC5 was prepared via solution polymerization in a dual loop reactor system in the presence of a Zirconium based catalyst system in the first reactor and a constrained geometry catalyst system in the second reactor;

wherein the Zirconium based catalyst system comprises [2,2'''-[1,3-propanediylbis(oxy-κO)]bis[3'',5,5''-tris(1,1-dimethylethyl)-5'-methyl[1,1':3',1''-terphenyl]-2'-olato-κO]] dimethyl-, (OC-6-33)-Zirconium, represented by the following formula:

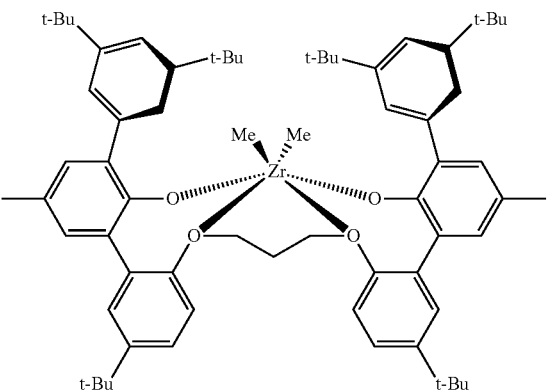

and wherein constrained geometry catalyst comprises (N-(1,1-dimethylethyl)-1,1-dimethyl-1-((1,2,3,3a,7a-h)-3-(1-pyrrolidinyl)-1H-inden-1-yl) silanaminato(2-)-N)((2,3,4,5-h)-2,4-pentadiene)titanium, represented by the following formula:

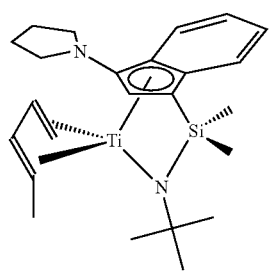

The polymerization conditions for IPC5 is reported in Table 2B. Referring to Table 2B, MMAO is modified methyl aluminoxane; and RIBS-2 is bis(hydrogenated tallow alkyl) methyl, tetrakis(pentafluorophenyl)borate(1-)amine, used as cocatalysts.

Inventive Polyolefin Composition 6

Inventive polyolefin composition 6 (IPC6) comprises an ethylene-octene interpolymer, having a density of approximately 0.914 g/cm$^3$, a melt index ($I_2$), measured at 190° C. and 2.16 kg, of approximately 0.8 g/10 minutes, an melt flow ratio ($I_{10}/I_2$) of approximately 7.1. Additional properties of IPC6 were measured, and are reported in Table 1B.

IPC6 was prepared via solution polymerization in a dual loop reactor system in the presence of a Hafnium based catalyst system in the first reactor and a Zirconium based catalyst system in second reactor;

wherein the hafnium based catalyst system comprises bis((2-oxoyl-3-(dibenzo-1H-pyrrole-1-yl)-5-(methyl)phenyl)-2-phenoxymethyl)-methylenetrans-1,2-cyclohexanediylhafnium (IV)dimethyl, represented by the following formula:

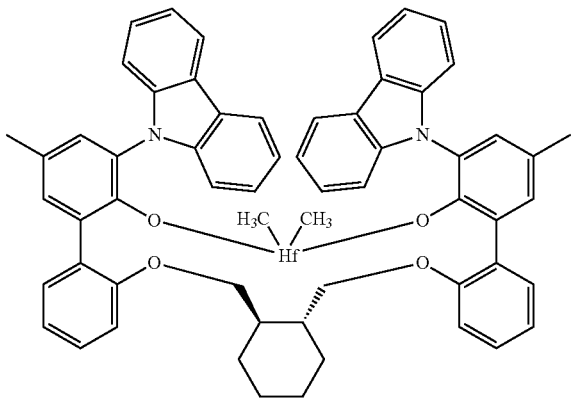

and wherein the Zirconium based catalyst system comprises [2,2'''-[1,3-propanediylbis(oxy-κO)]bis[3'',5,5''-tris(1,1-dimethylethyl)-5'-methyl[1,1':3',1''-terphenyl]-2'-olato-κO]] dimethyl-, (OC-6-33)-Zirconium, represented by the following formula:

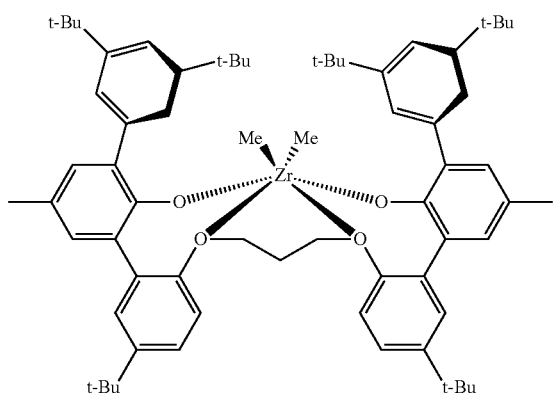

The polymerization conditions for IPC6 are reported in Table 2B. Referring to Table 2B, MMAO is modified methyl aluminoxane; and RIBS-2 is bis(hydrogenated tallow alkyl) methyl, tetrakis(pentafluorophenyl)borate(1-) amine, used as cocatalysts.

Inventive Polyolefin Composition 7

Inventive polyolefin composition 7 (IPC7) comprises an ethylene-octene interpolymer, having a density of approximately 0.913 g/cm³, a melt index ($I_2$), measured at 190° C. and 2.16 kg, of approximately 0.8 g/10 minutes, an melt flow ratio ($I_{10}/I_2$) of approximately 6.4. Additional properties of IPC7 were measured, and are reported in Table 1B.

IPC7 was prepared via solution polymerization in a dual loop reactor system in the presence of a Hafnium based catalyst system in the first reactor and a Zirconium based catalyst system in second reactor;

wherein the Hafnium based catalyst comprises a 2-[N-(2,6-diisopropylphenylamido)-o-isopropylphenylmethyl]-6-(2-η-1-naphthyl)-pyridyl hafnium(IV)dimethyl catalyst system, further described in U.S. Pat. No. 6,953,764, incorporated herein by reference, and having a structure according to the following formula:

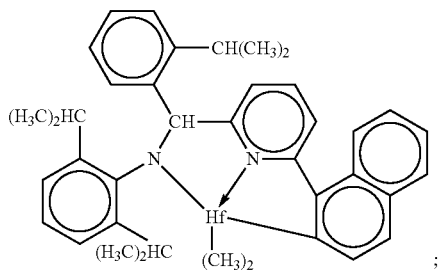

and wherein the Zirconium based catalyst system comprises [2,2'''-[1,3-propanediylbis(oxy-κO)]bis[3'',5,5''-tris(1,1-dimethylethyl)-5'-methyl[1,1':3',1''-terphenyl]-2'-olato-κO]] dimethyl-, (OC-6-33)-Zirconium, represented by the following formula:

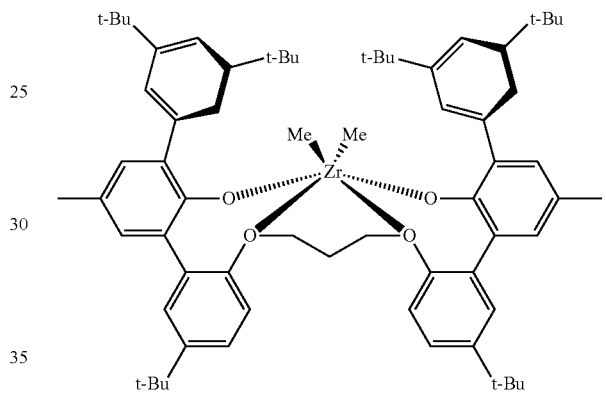

The polymerization conditions for IPC7 are reported in Table 2C. Referring to Table 2C, MMAO is modified methyl aluminoxane; and RIBS-2 is bis(hydrogenated tallow alkyl) methyl, tetrakis(pentafluorophenyl)borate(1-)amine, used as cocatalysts.

The following examples illustrate the comparative compositions.

Comparative Polyolefin Composition 1

Comparative example 1 (CPC1) is EXCEED™ 1012 commercially available from ExxonMobil Chemical Company. The properties of CPC2 were measured, and are reported in Table 1A.

Comparative Polyolefin Composition 2

Comparative polyolefin composition 2 (CPC2) comprises an ethylene-octene interpolymer having a density of approximately 0.907 g/cm³, a melt index ($I_2$), measured at 190° C. and 2.16 kg, of approximately 0.9 g/10 minutes, an melt flow ratio ($I_{10}/I_2$) of approximately 8.6. Additional properties of CPC2 were measured, and are reported in Table 1A.

CPC2 was prepared via solution polymerization in a dual loop reactor system in the presence of a Zirconium based catalyst system in both first and second reactor, wherein the Zirconium based catalyst system comprises [2,2'''-[1,3-propanediylbis(oxy-κO)]bis[3'',5,5''-tris(1,1-dimethylethyl)-5'-methyl[1,1:3',1''-terphenyl]-2'-olato-κO]]dimethyl-, (OC-6-33)-Zirconium, represented by the following formula:

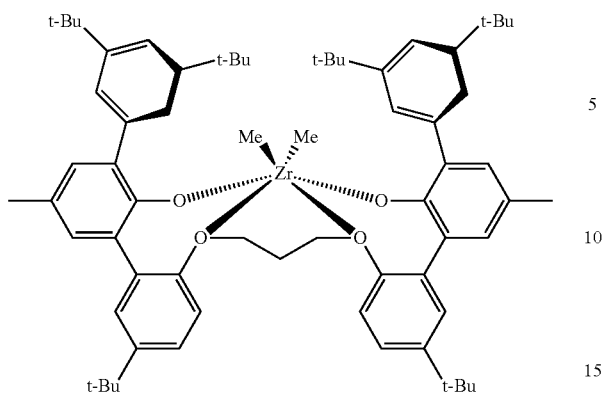

The polymerization conditions for CPC2 are reported in Table 2C Referring to Table 2C, MMAO is modified methyl aluminoxane; and RIBS-2 is bis(hydrogenated tallow alkyl) methyl, tetrakis(pentafluorophenyl)borate(1-)amine, used as cocatalysts.

TABLE 1A

|  | Test Method | Unit | CPC1 | CPC2 | IPC1 | IPC2 | IPC3 |
|---|---|---|---|---|---|---|---|
| Density | ASTM D792 Method B | g/cm3 | 0.9110 | 0.9066 | 0.9134 | 0.9126 | 0.9123 |
| I2 | ASTM D1238 | g/10 min | 1.05 | 0.86 | 0.81 | 0.84 | 0.81 |
| I10/I2 | ASTM D1238 |  | 5.7 | 8.57 | 6.7 | 6.58 | 6.18 |
| Tm1 | DSC | °C. | 101.1 | 105.6 | 113.9 | 108.6 | 108.9 |
| Tm2 | DSC | °C. | −114.1 | — | — | — | — |
| Delta Hf | DSC | J/g | 125.7 | 116.4 | 135.4 | 133.0 | 133.0 |
| Tc1 | DSC | °C. | 101.3 | 90.5 | 95.8 | 93.0 | 91.4 |
| Tc2 | DSC | °C. | 90.4 | 57.5 | — | — | — |
| Tc3 | DSC | °C. | 60.8 | — | — | — | — |
| Delta Hc | DSC | J/g | 124.9 | 116.4 | 140.3 | 136.7 | 135.6 |
| Comonomer Dist. Index | CDC Method |  | 0.750 | 0.918 | 0.820 | 0.921 | 0.900 |
| Stdev, C | CDC Method |  | 10.002 | 12.089 | 10.283 | 5.828 | 6.392 |
| HalfWidth, C | CDC Method |  | 20.760 | 19.052 | 12.040 | 5.656 | 5.529 |
| HalfWidth/Stdev | CDC Method |  | 2.076 | 1.576 | 1.171 | 0.970 | 0.865 |
| CDC | CDC Method |  | 36.1 | 58.3 | 70.0 | 94.9 | 104.1 |
| Comonomer (Cx) type | $^{13}$C NMR |  | Hexene | Octene | Octene | Octene | Octene |
| Cx Mol % | $^{13}$C NMR | % | 3.48 | 3.78 | 3.0 | 2.74 | 2.61 |
| Cx wt % | $^{13}$C NMR | % | 9.77 | 13.58 | 11.0 | 10.14 | 9.67 |
| C4 Branches/1000C | $^{13}$C NMR |  | 16.3 | — | — | — | — |
| C6 Branches/1000C | $^{13}$C NMR |  | — | 17.0 | 13.8 | 12.7 | 12.1 |
| Vinyl/1000C | $^{1}$H NMR |  | 0.053 | 0.046 | 0.048 | 0.038 | 0.011 |
| Cis & Trans Vinylenes/1000C | $^{1}$H NMR |  | 0.014 | 0.006 | 0.025 | 0.005 | 0.006 |
| Trisub/1000C | $^{1}$H NMR |  | 0.074 | 0.005 | 0.016 | — | 0.002 |
| Vinylidene/1000C | $^{1}$H NMR |  | 0.03 | 0.01 | 0.022 | 0.004 | — |
| Total unsat/1000C | $^{1}$H NMR |  | 0.17 | 0.06 | 0.111 | 0.05 | 0.02 |
| Mn | Conv. GPC | g/mol | 49,405 | 43,150 | 32,443 | 50,931 | 51,847 |
| Mz | Conv. GPC | g/mol | 201,450 | 192,765 | 249,095 | 203,287 | 220,064 |
| Mw/Mn | Conv. GPC |  | 2.30 | 2.33 | 3.72 | 2.18 | 2.28 |
| η* @ 0.1 rad/s | DMS | Pa·s | 6,253 | 11,605 | 8,574 | 9,548 | 8,740 |
| [η* @ 0.1(rad/s)]/[η* @100 (rad/s)] | DMS |  | 2.7 | 6.7 | 4.2 | 4.1 | 3.6 |
| G' @ 0.1 rad/s | DMS | Pa | 12 | 223 | 30 | 90 | 47 |
| Tan Delta @ 0.1 rad/s | DMS |  | 54.2 | 5.1 | 28.3 | 11 | 19 |
| η$_0$ | Creep zero shear viscosity | Pa·s | 6,949 | 14,327 | 9,272 | 10,515 | 9,756 |
| ZSVR | Calculated |  | 1.08 | 3.45 | 1.14 | 1.75 | 1.34 |

TABLE 1B

| Sample Name | Test Method | Units | IPC4 | IPC5 | IPC 6 | IPC7 |
|---|---|---|---|---|---|---|
| Density | ASTM D792 Method B | g/cm3 | 0.9134 | 0.9134 | 0.9139 | 0.9132 |
| I2 | ASTM D1238 | g/10 min | 0.77 | 0.87 | 0.82 | 0.83 |
| I10/I2 | ASTM D1238 |  | 6.3 | 7.2 | 7.1 | 6.4 |
| Tm1 | DSC | °C. | 108.5 | 109.8 | 113.6 | 114.6 |

TABLE 1B-continued

| Sample Name | Test Method | Units | IPC4 | IPC5 | IPC 6 | IPC7 |
|---|---|---|---|---|---|---|
| Delta Hf | DSC | J/g | 135.5 | 135 | 129.6 | 134.1 |
| Tc1 | DSC | ° C. | 93.1 | 93.9 | 95.99 | 96.3 |
| Delta Hc | DSC | J/g | 138.8 | 136.3 | 129.2 | 138.5 |
| Comonomer Dist. Index | CDC Method | | 0.948 | 0.924 | 0.874 | 0.714 |
| Stdev, C | CDC Method | | 5.091 | 7.262 | 11.502 | 14.445 |
| HalfWidth, C | CDC Method | | 7.350 | 14.610 | 10.333 | 11.003 |
| HalfWidth/Stdev | CDC Method | | 1.444 | 2.012 | 0.898 | 0.762 |
| CDC | CDC Method | | 65.6 | 45.9 | 97.2 | 93.7 |
| Comonomer (Cx) type | $^{13}$C NMR | | Octene | Octene | Octene | Octene |
| Cx Mol % | $^{13}$C NMR | % | 2.8 | 2.9 | 2.72 | 2.9 |
| Cx wt % | $^{13}$C NMR | % | 10.2 | 10.6 | 10.04 | 10.7 |
| C4 Branches/1000C | $^{13}$C NMR | | — | — | — | — |
| C6 Branches/1000C | $^{13}$C NMR | | 12.8 | 13.2 | 12.6 | 13.4 |
| Vinyl/1000C | $^{1}$H NMR | | 0.032 | 0.038 | 0.031 | 0.034 |
| Cis & Trans Vinylenes/1000C | $^{1}$H NMR | | 0.004 | 0.025 | 0.004 | 0.004 |
| Trisub/1000C | $^{1}$H NMR | | 0.002 | 0.012 | ND | 0.004 |
| Vinylidene/1000C | $^{1}$H NMR | | 0.017 | 0.009 | 0.003 | 0.014 |
| Total unsat/1000C | $^{1}$H NMR | | 0.054 | 0.084 | 0.037 | 0.057 |
| Mn | Conv. GPC | g/mol | 36,641 | 38,259 | 44,951 | 42,208 |
| Mz | Conv. GPC | g/mol | 235,101 | 225,772 | 236,343 | 224,068 |
| Mw/Mn | Conv. GPC | | 3.31 | 2.92 | 2.56 | 2.81 |
| $\eta^*$ @ 0.1 rad/s | DMS | Pa · s | 8,756 | 9,260 | 9,249 | 8,484 |
| [$\eta^*$ @ 0.1(rad/s)]/[$\eta^*$@100 (rad/s)] | DMS | | 3.7 | 4.7 | 4.6 | 3.8 |
| G' @ 0.1 rad/s | DMS | Pa | 28 | 99 | 76 | 32 |
| Tan Delta @ 0.1 rad/s | DMS | | 31.8 | 9.3 | 12.1 | 26.4 |
| $\eta_0$ | Creep zero shear visc. | Pa · s | 9,390 | 10,667 | 10,560 | 9,091 |
| ZSVR | Calculated | | 1.14 | 1.75 | 1.55 | 1.20 |

TABLE 2A

| | | Sample # | | |
|---|---|---|---|---|
| | Units | IPC1 | IPC2 | IPC 3 |
| REACTOR FEEDS | | | | |
| Rx1 Total Solvent Flow | lb/hr | 1350 | 1364 | 1248 |
| Rx1 Fresh Ethylene Flow | lb/hr | 234 | 226 | 238 |
| Rx1 Total Ethylene Flow | lb/hr | 245 | 237 | 248 |
| Rx1 Fresh Comonomer Flow | lb/hr | 47 | 41 | 31 |
| Rx1 Total Comonomer Flow | lb/hr | 115 | 106 | 60 |
| Rx1 Feed Solvent/Ethylene Ratio | Ratio | 5.77 | 6.03 | 5.24 |
| Rx1 Hydrogen Mole Percent | mol % | 0.41 | 0.56 | 1.79 |
| Rx2 Total Solvent Flow | lb/hr | 368 | 383 | 345 |
| Rx2 Fresh Ethylene Flow | lb/hr | 138 | 143 | 132 |
| Rx2 Total Ethylene Flow | lb/hr | 141 | 146 | 135 |
| Rx2 Fresh Comonomer Flow | lb/hr | 0 | 0 | 9 |
| Rx2 Total Comonomer Flow | lb/hr | 20 | 19 | 17 |
| Rx2 Feed Solvent/Ethylene Ratio | Ratio | 2.67 | 2.68 | 2.61 |
| Rx2 Hydrogen Mole Percent | mol % | 0.016 | 0.014 | 0.017 |
| REACTION | | | | |
| Rx1 Control Temperature | ° C. | 119 | 120 | 130 |
| Rx1 Exit Comonomer Concentration | g/L | 30.8 | 32.4 | 13.9 |
| Rx1 Ethylene Conversion | % | 77.2 | 81.8 | 77.2 |
| Rx1 FTnIR Exit C2 Conc. (raw) | g/L | 22.3 | 17.0 | 23.4 |
| Rx1 FTnIR Exit C2 Conc. (cor.) | g/L | 22.3 | 17.0 | 23.4 |
| Rx1 FTnIR Correction Factor | g/L | 0.0 | 0.00 | 0.00 |
| Rx1 Log Viscosity | — | 3.54 | 3.15 | 3.10 |
| Rx1 Viscosity | cP | 3480 | 1415 | 1255 |
| Rx2 Control Temperature | ° C. | 175 | 175 | 175 |
| Rx2 Exit Comonomer Concentration | g/L | 16.9 | 15.6 | 4.2 |
| Rx2 Ethylene Conversion | % | 83.9 | 82.8 | 83.2 |
| Rx2 FTnIR Exit C2 Conc. (raw) | g/L | 14.9 | 14.7 | 14.4 |
| Rx2 FTnIR Exit C2 Conc (cor) | g/L | 9.3 | 9.3 | 10.0 |
| Rx2 FTnIR Correction Factor | g/L | −5.6 | −5.4 | −4.4 |
| Rx2 Log Viscosity | — | 2.88 | 2.70 | 3.00 |
| Rx2 Viscosity | cP | 753 | 501 | 992 |
| Rx1 Split | % | 55 | 56 | 54 |

TABLE 2A-continued

|  | Units | Sample # | | |
|---|---|---|---|---|
|  |  | IPC1 | IPC2 | IPC 3 |
| CATALYST | | | | |
| Rx1 Catalyst Efficiency | Lb Polymer/Lb metal present in the catalyst system | 210,000 | 18,520,000 | 15,650,000 |
| Rx1 RIBS-2 Molar Ratio | Ratio | 1.49 | 1.69 | 1.67 |
| Rx1 MMAO Molar Ratio | Ratio | 8.62 | 16.24 | 9.91 |
| Rx2 Catalyst Efficiency | Lb Polymer/Lb metal present in the catalyst system | 3,070,000 | 3,300,000 | 2,2500,000 |
| Rx2 RIBS-2 Molar Ratio | Ratio | 1.22 | 1.54 | 1.41 |
| Rx2 MMAO Molar Ratio | Ratio | 4.97 | 6.92 | 4.91 |

TABLE 2B

|  | Units | Sample # | | |
|---|---|---|---|---|
|  |  | IPC4 | IPC5 | IPC6 |
| REACTOR FEEDS | | | | |
| Rx1 Total Solvent Flow | lb/hr | 1558 | 1221 | 1279 |
| Rx1 Fresh Ethylene Flow | lb/hr | 270 | 212 | 222 |
| Rx1 Total Ethylene Flow | lb/hr | 283 | 222 | 232 |
| Rx1 Fresh Comonomer Flow | lb/hr | 39 | 44 | 39 |
| Rx1 Total Comonomer Flow | lb/hr | 105 | 122 | 78 |
| Rx1 Feed Solvent/Ethylene Ratio | Ratio | 5.77 | 5.76 | 5.76 |
| Rx1 Hydrogen Mole Percent | mol % | 0.57 | 0.40 | 0.86 |
| Rx2 Total Solvent Flow | lb/hr | 233 | 420 | 421 |
| Rx2 Fresh Ethylene Flow | lb/hr | 79 | 157 | 146 |
| Rx2 Total Ethylene Flow | lb/hr | 81 | 160 | 150 |
| Rx2 Fresh Comonomer Flow | lb/hr | 0 | 0 | 0 |
| Rx2 Total Comonomer Flow | lb/hr | 10 | 28 | 14 |
| Rx2 Feed Solvent/Ethylene Ratio | Ratio | 2.95 | 2.67 | 2.88 |
| Rx2 Hydrogen Mole Percent | mol % | 0.028 | 0.014 | 0.015 |
| REACTION | | | | |
| Rx1 Control Temperature | ° C. | 120 | 120 | 150 |
| Rx1 Exit Comonomer Concentration | g/L | 24.2 | 40.6 | 16.1 |
| Rx1 Ethylene Conversion | % | 71.3 | 83.2 | 79.7 |
| Rx1 FTnIR Exit C2 Conc. (raw) | g/L | 27.4 | 16.4 | 18.7 |
| Rx1 FTnIR Exit C2 Conc. (cor.) | g/L | 27.4 | 16.4 | 18.7 |
| Rx1 FTnIR Correction Factor | g/L | 0.0 | 0.0 | 0.0 |
| Rx1 Log Viscosity | — | 3.27 | 3.39 | 3.01 |
| Rx1 Viscosity | cP | 1858 | 2453 | 1033 |
| Rx2 Control Temperature | ° C. | 175 | 175 | 175 |
| Rx2 Exit Comonomer Concentration | g/L | 12.6 | 23.0 | 7.5 |
| Rx2 Ethylene Conversion | % | 80.8 | 83.5 | 83.9 |
| Rx2 FTnIR Exit C2 Conc (raw) | g/L | 14.3 | 14.9 | 14.4 |
| Rx2 FTnIR Exit C2 Conc (cor) | g/L | 8.8 | 9.9 | 9.2 |
| Rx2 FTnIR Correction Factor | g/L | −5.5 | −5.1 | −5.2 |
| Rx2 Log Viscosity | — | 2.76 | 2.79 | 2.73 |
| Rx2 Viscosity | cP | 569 | 612 | 534 |
| Rx1 Split | % | 60 | 54 | 54 |
| CATALYST | | | | |
| Rx1 Catalyst Efficiency | Lb Polymer/Lb metal present in the catalyst system | 190,000 | 17,210,000 | 12,780,000 |
| Rx1 RIBS-2 Molar Ratio | Ratio | 1.49 | 1.40 | 1.97 |
| Rx1 MMAO Molar Ratio | Ratio | 5.29 | 8.33 | 13.89 |
| Rx2 Catalyst Efficiency | Lb Polymer/Lb metal present in the catalyst system | 5,120,000 | 4,980,000 | 8,360,000 |
| Rx2 RIBS-2 Molar Ratio | Ratio | 1.55 | 1.22 | 1.15 |
| Rx2 MMAO Molar Ratio | Ratio | 8.54 | 4.95 | 5.32 |

TABLE 2C

|  | Units | Sample # IPC7 | CPC2 |
|---|---|---|---|
| REACTOR FEEDS | | | |
| Rx1 Total Solvent Flow | lb/hr | 1409 | 1108 |
| Rx1 Fresh Ethylene Flow | lb/hr | 205 | 192 |
| Rx1 Total Ethylene Flow | lb/hr | 216 | 202 |
| Rx1 Fresh Comonomer Flow | lb/hr | 44 | 55 |
| Rx1 Total Comonomer Flow | lb/hr | 82 | 87 |
| Rx1 Feed Solvent/Ethylene Ratio | Ratio | 6.87 | 5.76 |
| Rx1 Hydrogen Mole Percent | mol % | 0.41 | 0.18 |
| Rx2 Total Solvent Flow | lb/hr | 438 | 426 |
| Rx2 Fresh Ethylene Flow | lb/hr | 166 | 160 |
| Rx2 Total Ethylene Flow | lb/hr | 170 | 163 |
| Rx2 Fresh Comonomer Flow | lb/hr | 0 | 0 |
| Rx2 Total Comonomer Flow | lb/hr | 13 | 13 |
| Rx2 Feed Solvent/Ethylene Ratio | Ratio | 2.64 | 2.67 |
| Rx2 Hydrogen Mole Percent | mol % | 0.521 | 0.216 |
| REACTION | | | |
| Rx1 Control Temperature | ° C. | 118 | 150 |
| Rx1 Exit Comonomer Concentration | g/L | 17.2 | 21.2 |
| Rx1 Ethylene Conversion | % | 86.8 | 94.9 |
| Rx1 FTnIR Exit C2 Conc. (raw) | g/L | 11.3 | 5.0 |
| Rx1 FTnIR Exit C2 Conc. (cor.) | g/L | 11.3 | 5.0 |
| Rx1 FTnIR Correction Factor | g/L | 0.0 | 0 |
| Rx1 Log Viscosity | — | 3.40 | 3.14 |
| Rx1 Viscosity | cP | 2494 | 1375 |
| Rx2 Control Temperature | ° C. | 175 | 190 |
| Rx2 Exit Comonomer Concentration | g/L | 6.0 | 1.5 |
| Rx2 Ethylene Conversion | % | 83.8 | 85.1 |
| Rx2 FTnIR Exit C2 Conc (raw) | g/L | 14.2 | 9.5 |
| Rx2 FTnIR Exit C2 Conc (cor) | g/L | 8.8 | 8.4 |
| Rx2 FTnIR Correction Factor | g/L | −5.4 | −1.1 |
| Rx2 Log Viscosity | — | 2.76 | 2.75 |
| Rx2 Viscosity | cP | 580 | 569 |
| Rx1 Split | % | 54 | 60 |
| CATALYST | | | |
| Rx1 Catalyst Efficiency | Lb Polymer/Lb metal present in the catalyst system | 200,000 | 5,030,000 |
| Rx1 RIBS-2 Molar Ratio | Ratio | 1.20 | 1.49 |
| Rx1 MMAO Molar Ratio | Ratio | 10.03 | 9.90 |
| Rx2 Catalyst Efficiency | Lb Polymer/Lb metal present in the catalyst system | 7,050,000 | 1,870,000 |
| Rx2 RIBS-2 Molar Ratio | Ratio | 1.62 | 1.54 |
| Rx2 MMAO Molar Ratio | Ratio | 9.92 | 10.06 |

Monolayer and Three Layer Co-extruded Film Fabrication

Monolayer and co-ex (three layer) films were fabricated on the Hosokawa Alpine 7-layer blown film line. This line consists of seven 50 mm, 30:1 L/D, grooved feed extruders utilizing barrier screws and a 250 mm (9.9 inch) co-ex die. The die is equipped with internal bubble cooling.

Monolayer Films

IPC1 to IPC7, CPC1 and CPC2 were formed into inventive monolayer blown films 1-7 and comparative monolayer blown films 1-2. Inventive monolayer blown films (IMBF) 1-7 and comparative monolayer blown films (CMBF) 1-2 were fabricated on the Hosokawa Alpine 7-layer blown film line. Extrusion condition set points and measured conditions are listed below.

Set Points:

BUR=2.5

Die output=11.3 pph/in

Die gap=2 mm

Frost line height=35-37 in

Die size=250 mm

Measured extrusion conditions for CMBF1 and IMBF2 are given in Tables 3A-G.

TABLE 3A

| Sample Name | Air ring (%) | IBC (%) | Exhaust (%) | Lay flat (in) | Nip Speed (ft/min) |
|---|---|---|---|---|---|
| IMBF2 | 50.0 | 60 | 55.7 | 38.53 | 190.7 |
| CMBF1 | 51.5 | 60 | 57.0 | 38.71 | 189.3 |

TABLE 3B

| | Extruder 1 | | Extruder 2 | | Extruder 3 | |
|---|---|---|---|---|---|---|
| Sample # IMBF2 | Set | Actual | Set | Actual | Set | Actual |
| Barrel 1 Temp (° F.) | 70.0 | 71.9 | 70.0 | 71.7 | 70.0 | 72.5 |
| Barrel 2 Temp (° F.) | 380.0 | 379.9 | 380.0 | 379.7 | 380.0 | 379.9 |
| Barrel 3 Temp (° F.) | 380.0 | 380.0 | 380.0 | 380.0 | 380.0 | 379.4 |
| Barrel 4 Temp (° F.) | 380.0 | 379.7 | 380.0 | 379.8 | 380.0 | 379.8 |
| Barrel 5 Temp (° F.) | 380.0 | 384.6 | 380.0 | 379.8 | 380.0 | 379.9 |
| Barrel 6 Temp (° F.) | 450.0 | 446.1 | 450.0 | 448.1 | 450.0 | 448.2 |
| Barrel 7 Temp (° F.) | 450.0 | 450.7 | 450.0 | 450.0 | 450.0 | 450.3 |
| Barrel 8 Temp (° F.) | 450.0 | 449.0 | 450.0 | 449.8 | 450.0 | 449.1 |
| Extruder RPM | 61.6 | 61.6 | 56.9 | 56.8 | 57.7 | 57.6 |

TABLE 3B-continued

| Sample # IMBF2 | Extruder 1 Set | Extruder 1 Actual | Extruder 2 Set | Extruder 2 Actual | Extruder 3 Set | Extruder 3 Actual |
|---|---|---|---|---|---|---|
| Output (lb/h) | 52.5 | 53.7 | 49.0 | 49.1 | 49.0 | 48.8 |
| Melt Pressure before screen pack (psi) | 5717 | | 5927 | | 6781 | |
| Motor load (%) | | 48.6 | | 47.7 | | 49.5 |
| Melt Temp (° F.) | | 512.5 | | 500.9 | | 498.3 |

TABLE 3C

| Sample # IMBF2 | Extruder 4 Set | Extruder 4 Actual | Extruder 5 Set | Extruder 5 Actual | Extruder 6 Set | Extruder 6 Actual |
|---|---|---|---|---|---|---|
| Barrel 1 Temp (° F.) | 70.0 | 73.7 | 70.0 | 70.5 | 70.0 | 73.7 |
| Barrel 2 Temp (° F.) | 380.0 | 379.6 | 380.0 | 379.7 | 380.0 | 379.8 |
| Barrel 3 Temp (° F.) | 380.0 | 379.8 | 380.0 | 379.9 | 380.0 | 380.0 |
| Barrel 4 Temp (° F.) | 380.0 | 379.7 | 380.0 | 379.1 | 380.0 | 379.1 |
| Barrel 5 Temp (° F.) | 380.0 | 380.2 | 380.0 | 379.9 | 380.0 | 379.9 |
| Barrel 6 Temp (° F.) | 450.0 | 449.7 | 450.0 | 448.8 | 450.0 | 448.0 |
| Barrel 7 Temp (° F.) | 450.0 | 450.1 | 450.0 | 450.2 | 450.0 | 451.5 |
| Barrel 8 Temp (° F.) | 450.0 | 450.7 | 450.0 | 450.3 | 450.0 | 449.0 |
| Extruder RPM | 58.4 | 58.4 | 58.1 | 58.2 | 54.6 | 54.6 |
| Output (lb/h) | 49.0 | 48.8 | 49.0 | 48.9 | 49.0 | 48.8 |
| Melt Pressure before screen pack (psi) | 6948 | | 6670 | | 6427 | |
| Motor load (%) | | 49.2 | | 48.7 | | 48.9 |
| Melt Temp (° F.) | | 494.6 | | 491.8 | | 498.4 |

TABLE 3D

| Sample # IMBF2 | Extruder 7 Set | Extruder 7 Actual |
|---|---|---|
| Barrel 1 Temp (° F.) | 70.0 | 70.7 |
| Barrel 2 Temp (° F.) | 380.0 | 380.0 |
| Barrel 3 Temp (° F.) | 380.0 | 380.5 |
| Barrel 4 Temp (° F.) | 380.0 | 379.8 |
| Barrel 5 Temp (° F.) | 380.0 | 380.2 |
| Barrel 6 Temp (° F.) | 450.0 | 450.3 |
| Barrel 7 Temp (° F.) | 450.0 | 451.1 |
| Barrel 8 Temp (° F.) | 450.0 | 450.1 |
| Extruder RPM | 57.0 | 57.0 |
| Output (lb/h) | 52.5 | 52.8 |
| Melt Pressure before screen pack (psi) | 6628 | |
| Motor load (%) | | 50.8 |
| Melt Temp (° F.) | | 497.1 |

TABLE 3E

| Sample # CMBF1 | Extruder 1 Set | Extruder 1 Actual | Extruder 2 Set | Extruder 2 Actual | Extruder 3 Set | Extruder 3 Actual |
|---|---|---|---|---|---|---|
| Barrel 1 Temp (° F.) | 70.0 | 67.3 | 70.0 | 69.2 | 70.0 | 70.6 |
| Barrel 2 Temp (° F.) | 380.0 | 381.1 | 380.0 | 379.4 | 380.0 | 380.0 |
| Barrel 3 Temp (° F.) | 380.0 | 380.2 | 380.0 | 380.0 | 380.0 | 380.3 |
| Barrel 4 Temp (° F.) | 380.0 | 378.4 | 380.0 | 379.1 | 380.0 | 379.1 |
| Barrel 5 Temp (° F.) | 380.0 | 378.3 | 380.0 | 379.2 | 380.0 | 379.4 |
| Barrel 6 Temp (° F.) | 450.0 | 448.1 | 450.0 | 449.8 | 450.0 | 449.2 |
| Barrel 7 Temp (° F.) | 450.0 | 449.3 | 450.0 | 449.6 | 450.0 | 450.1 |
| Barrel 8 Temp (° F.) | 450.0 | 449.0 | 450.0 | 449.6 | 450.0 | 449.5 |
| Extruder RPM | 49.8 | 49.8 | 45.5 | 45.5 | 44.0 | 44.0 |
| Output (lb/h) | 52.5 | 52.6 | 49.0 | 49.0 | 49.0 | 49.2 |
| Melt Pressure before screen pack (psi) | 5342 | | 5083 | | 5828 | |

TABLE 3E-continued

| Sample # CMBF1 | Extruder 1 Set | Extruder 1 Actual | Extruder 2 Set | Extruder 2 Actual | Extruder 3 Set | Extruder 3 Actual |
|---|---|---|---|---|---|---|
| Motor load (%) | | 51.2 | | 51.8 | | 54.1 |
| Melt Temp (° F.) | | 489.7 | | 480.1 | | 485.1 |

TABLE 3F

| Sample # CMBF1 | Extruder 4 Set | Extruder 4 Actual | Extruder 5 Set | Extruder 5 Actual | Extruder 6 Set | Extruder 6 Actual |
|---|---|---|---|---|---|---|
| Barrel 1 Temp (° F.) | 70.0 | 70.9 | 70.0 | 69.5 | 70.0 | 70.8 |
| Barrel 2 Temp (° F.) | 380.0 | 379.6 | 380.0 | 379.1 | 380.0 | 378.7 |
| Barrel 3 Temp (° F.) | 380.0 | 379.6 | 380.0 | 380.1 | 380.0 | 378.5 |
| Barrel 4 Temp (° F.) | 380.0 | 379.7 | 380.0 | 379.4 | 380.0 | 374.8 |
| Barrel 5 Temp (° F.) | 380.0 | 380.0 | 380.0 | 379.0 | 380.0 | 379.1 |
| Barrel 6 Temp (° F.) | 450.0 | 450.7 | 450.0 | 450.3 | 450.0 | 447.2 |
| Barrel 7 Temp (° F.) | 450.0 | 448.5 | 450.0 | 449.6 | 450.0 | 449.3 |
| Barrel 8 Temp (° F.) | 450.0 | 451.0 | 450.0 | 450.3 | 450.0 | 449.1 |
| Extruder RPM | 45.1 | 45.0 | 44.8 | 44.9 | 45.9 | 45.9 |
| Output (lb/h) | 49.0 | 48.8 | 49.0 | 48.7 | 49.0 | 49.1 |
| Melt Pressure before screen pack (psi) | 5120 | | 5101 | | 5362 | |
| Motor load (%) | | 52.7 | | 53.3 | | 53.1 |
| Melt Temp (° F.) | | 471.6 | | 468.2 | | 482.4 |

TABLE 3G

| Sample # CMBF1 | Extruder 7 Set | Extruder 7 Actual |
|---|---|---|
| Barrel 1 Temp (° F.) | 70.0 | 70.1 |
| Barrel 2 Temp (° F.) | 380.0 | 380.9 |
| Barrel 3 Temp (° F.) | 380.0 | 380.7 |
| Barrel 4 Temp (° F.) | 380.0 | 380.8 |
| Barrel 5 Temp (° F.) | 380.0 | 381.4 |
| Barrel 6 Temp (° F.) | 450.0 | 451.6 |
| Barrel 7 Temp (° F.) | 450.0 | 450.3 |
| Barrel 8 Temp (° F.) | 450.0 | 450.2 |
| Extruder RPM | 43.5 | 43.5 |
| Output (lb/h) | 52.5 | 52.3 |
| Melt Pressure before screen pack (psi) | 5323 | |
| Motor load (%) | | 54.9 |
| Melt Temp (° F.) | | 464.1 |

Three Layer Co-extruded Blown Films

ICP1-7 and CPC1-2 were formed into inventive three layer co-extruded blown films 1-7 and comparative three layer co-extruded blown films 1-2. Inventive three layer co-extruded blown films ITCBF 1-7 and comparative three layer co-extruded blown films CTCBF 1-2 were fabricated on the Hosokawa Alpine 7-layer blown film line. Extrusion condition set points and measured conditions are listed below.

Set Points:

BUR=2.5

Die output=14.6 pph/in

Die gap=2 mm

Frost line height=35-37 in

Lay flat=38.6-38.7 in

Die size=250 mm

Measured extrusion conditions for CTCBF1 and ITCBF2 are given in Table 4A-G.

TABLE 4A

| Sample Name | Air ring (%) | IBC (%) | Exhaust (%) | Blocking (0-5) | Nip Speed ft/min |
|---|---|---|---|---|---|
| ITCBF2 | 53 | 60 | 56.1 | 2 | 123.6 |
| CTCBF1 | 51 | 60 | 56.0 | 2 | 121.8 |

TABLE 4B

| | Extruder 1 | | Extruder 2 | | Extruder 3 | |
|---|---|---|---|---|---|---|
| Sample # ITCBF2 | Set | Actual | Set | Actual | Set | Actual |
| Barrel 1 Temp (° F.) | 70.0 | 100.6 | 70.0 | 87.6 | 70.0 | 82.0 |
| Barrel 2 Temp (° F.) | 380.0 | 380.6 | 380.0 | 380.1 | 380.0 | 379.9 |
| Barrel 3 Temp (° F.) | 380.0 | 379.7 | 380.0 | 379.8 | 380.0 | 379.8 |
| Barrel 4 Temp (° F.) | 380.0 | 378.5 | 380.0 | 379.8 | 380.0 | 380.2 |
| Barrel 5 Temp (° F.) | 380.0 | 377.3 | 380.0 | 379.8 | 380.0 | 380.0 |
| Barrel 6 Temp (° F.) | 450.0 | 449.0 | 450.0 | 450.2 | 450.0 | 450.1 |
| Barrel 7 Temp (° F.) | 450.0 | 450.4 | 450.0 | 450.3 | 450.0 | 451.4 |
| Barrel 8 Temp (° F.) | 450.0 | 449.4 | 450.0 | 450.2 | 450.0 | 450.2 |
| Extruder RPM | 71.0 | 71.1 | 43.8 | 43.7 | 31.6 | 31.6 |
| Output (lb/h) | 90.0 | 90.5 | 67.5 | 68.6 | 45.0 | 44.8 |
| Melt Pressure before screen pack (psi) | 7006 | | 6294 | | 6113 | |
| Motor load (%) | 58.2 | | 55.9 | | 53.3 | |
| Melt Temp (° F.) | 475.9 | | 465.4 | | 469.8 | |

TABLE 4C

| | Extruder 4 | | Extruder 5 | | Extruder 6 | |
|---|---|---|---|---|---|---|
| Sample # ITCBF2 | Set | Actual | Set | Actual | Set | Actual |
| Barrel 1 Temp (° F.) | 70.0 | 83.0 | 70.0 | 69.6 | 70.0 | 92.7 |
| Barrel 2 Temp (° F.) | 380.0 | 380.3 | 380.0 | 380.1 | 380.0 | 380.5 |
| Barrel 3 Temp (° F.) | 380.0 | 379.7 | 380.0 | 380.2 | 380.0 | 380.0 |
| Barrel 4 Temp (° F.) | 380.0 | 379.7 | 380.0 | 380.0 | 380.0 | 379.5 |
| Barrel 5 Temp (° F.) | 380.0 | 380.2 | 380.0 | 380.0 | 380.0 | 379.9 |
| Barrel 6 Temp (° F.) | 450.0 | 449.9 | 450.0 | 449.9 | 450.0 | 449.9 |
| Barrel 7 Temp (° F.) | 450.0 | 450.3 | 450.0 | 450.1 | 450.0 | 451.9 |
| Barrel 8 Temp (° F.) | 450.0 | 449.6 | 450.0 | 450.2 | 450.0 | 449.7 |
| Extruder RPM | 31.2 | 31.2 | 30.9 | 30.8 | 44.2 | 44.0 |
| Output (lb/h) | 45.0 | 45.1 | 45.0 | 45.1 | 67.5 | 67.3 |
| Melt Pressure before screen pack (psi) | 6038 | | 5674 | | 6845 | |
| Motor load (%) | 52.7 | | 53.3 | | 56.4 | |
| Melt Temp (° F.) | 456.6 | | 452.4 | | 471.1 | |

TABLE 4D

| | Extruder 7 | |
|---|---|---|
| Sample # ITCBF2 | Set | Actual |
| Barrel 1 Temp (° F.) | 70.0 | 73.2 |
| Barrel 2 Temp (° F.) | 380.0 | 380.0 |
| Barrel 3 Temp (° F.) | 380.0 | 380.3 |
| Barrel 4 Temp (° F.) | 380.0 | 372.6 |
| Barrel 5 Temp (° F.) | 380.0 | 378.0 |
| Barrel 6 Temp (° F.) | 450.0 | 442.4 |
| Barrel 7 Temp (° F.) | 450.0 | 453.7 |
| Barrel 8 Temp (° F.) | 450.0 | 450.7 |
| Extruder RPM | 63.3 | 63.4 |
| Output (lb/h) | 90.0 | 90.2 |
| Melt Pressure before screen pack (psi) | 8971 | |
| Motor load (%) | 70.9 | |
| Melt Temp (° F.) | 492.8 | |

TABLE 4E

| | Extruder 1 | | Extruder 2 | | Extruder 3 | |
|---|---|---|---|---|---|---|
| Sample # CTCBF1 | Set | Actual | Set | Actual | Set | Actual |
| Barrel 1 Temp (° F.) | 70.0 | 97.5 | 70.0 | 89.3 | 70.0 | 79.1 |
| Barrel 2 Temp (° F.) | 380.0 | 380.0 | 380.0 | 380.0 | 380.0 | 379.9 |
| Barrel 3 Temp (° F.) | 380.0 | 380.2 | 380.0 | 380.2 | 380.0 | 380.1 |
| Barrel 4 Temp (° F.) | 380.0 | 380.7 | 380.0 | 380.1 | 380.0 | 380.2 |
| Barrel 5 Temp (° F.) | 380.0 | 382.2 | 380.0 | 380.0 | 380.0 | 379.9 |
| Barrel 6 Temp (° F.) | 450.0 | 450.1 | 450.0 | 450.0 | 450.0 | 450.1 |
| Barrel 7 Temp (° F.) | 450.0 | 449.6 | 450.0 | 449.4 | 450.0 | 452.1 |
| Barrel 8 Temp (° F.) | 450.0 | 450.0 | 450.0 | 449.5 | 450.0 | 450.9 |
| Extruder RPM | 71.7 | 71.6 | 45.8 | 45.8 | 29.5 | 29.5 |
| Output (lb/h) | 90.0 | 90.2 | 67.5 | 67.7 | 45.0 | 45.0 |
| Melt Pressure before screen pack (psi) | 6635 | | 6101 | | 5761 | |
| Motor load (%) | 56.3 | | 55.7 | | 53.9 | |
| Melt Temp (° F.) | 477.7 | | 467.0 | | 468.0 | |

TABLE 4F

| | Extruder 4 | | Extruder 5 | | Extruder 6 | |
|---|---|---|---|---|---|---|
| Sample # CTCBF1 | Set | Actual | Set | Actual | Set | Actual |
| Barrel 1 Temp (° F.) | 70.0 | 83.3 | 70.0 | 68.7 | 70.0 | 92.7 |
| Barrel 2 Temp (° F.) | 380.0 | 380.0 | 380.0 | 380.1 | 380.0 | 380.0 |
| Barrel 3 Temp (° F.) | 380.0 | 380.0 | 380.0 | 380.1 | 380.0 | 379.9 |
| Barrel 4 Temp (° F.) | 380.0 | 379.8 | 380.0 | 379.9 | 380.0 | 380.2 |
| Barrel 5 Temp (° F.) | 380.0 | 379.9 | 380.0 | 380.0 | 380.0 | 380.0 |
| Barrel 6 Temp (° F.) | 450.0 | 450.1 | 450.0 | 450.0 | 450.0 | 450.1 |
| Barrel 7 Temp (° F.) | 450.0 | 450.0 | 450.0 | 450.6 | 450.0 | 451.0 |
| Barrel 8 Temp (° F.) | 450.0 | 450.0 | 450.0 | 450.1 | 450.0 | 450.4 |
| Extruder RPM | 33.1 | 33.1 | 30.6 | 30.4 | 46.3 | 46.3 |
| Output (lb/h) | 45.0 | 45.1 | 45.0 | 44.9 | 67.5 | 67.1 |
| Melt Pressure before screen pack (psi) | 5749 | | 5531 | | 6676 | |
| Motor load (%) | 52.3 | | 54.1 | | 56.4 | |
| Melt Temp (° F.) | 456.7 | | 452.1 | | 469.3 | |

TABLE 4G

| | Extruder 7 | |
|---|---|---|
| Sample # CTCBF1 | Set | Actual |
| Barrel 1 Temp (° F.) | 70.0 | 70.2 |
| Barrel 2 Temp (° F.) | 380.0 | 379.6 |
| Barrel 3 Temp (° F.) | 380.0 | 379.6 |
| Barrel 4 Temp (° F.) | 380.0 | 380.2 |
| Barrel 5 Temp (° F.) | 380.0 | 379.7 |
| Barrel 6 Temp (° F.) | 450.0 | 449.8 |
| Barrel 7 Temp (° F.) | 450.0 | 452.4 |
| Barrel 8 Temp (° F.) | 450.0 | 450.1 |
| Extruder RPM | 55.8 | 55.8 |
| Output (lb/h) | 90.0 | 90.3 |
| Melt Pressure before screen pack (psi) | 6463 | |
| Motor load (%) | 61.9 | |
| Melt Temp (° F.) | 465.5 | |

Referring to FIG. 1, Extruder 1 was used to fabricate Layer 1 (the skin layer). Extruders 2, 3, 4, 5 and 6 were used to fabricate Layer 2 (the core layer), and Extruder 7 was used to fabricate Layer 3 (the sealant layer) on the inside of the blown film bubble. The layer ratio (amount) and thickness per layer number are given in Table 5.

TABLE 5

| Layer # | Amount (%) | Thickness (mil) |
|---|---|---|
| 1 | 20 | 0.4 |
| 2 | 60 | 1.2 |
| 3 | 20 | 0.4 |
| Total | 100 | 2 |

Inventive Laminated Structure (ILS) 1-7 and Comparative Laminated Structures (CLS)1-2

Inventive Laminated Structure (ILS) 1-7 and Comparative Laminated Structures (CLS) 1-2 were prepared according to the following process. The 48 g PET film (primary) goes though the coating deck where the solvent based two component adhesive (ADCOTE™ 577 A/B from The Dow Chemical Company), was applied at ~28-30% solids with a 130 cylinder with a volume of 18.2 billion per cubic micron (BCM) at a coat weight of ~1.75 lb per ream. After the adhesive is applied the web travels through a two zone oven to drive out all the solvent, then moves to the laminator consisting of a ~15 inch diameter heated steel roll and a ~7 inch diameter EPDM rubber roll. The back side of the coated PET film makes contact with the hot steel roll. In the meantime the three layer co-extruded blown film is corona treated to 38-42 dyne. The corona treated side of the three layer co-extruded blown film comes into contact with the adhesive side of the PET as it enters between the rubber roll and heated steel roll (~140-180° F. at a pressure of 40-60 psi where the PET film and the three layer co-extruded blown film are combined. The resulting co-extruded laminate structure is wound on the rewind system thus forming Inventive Laminated Structure (ILS) 1-7 and Comparative Laminated Structures (CLS) 1-2.

Referring to FIG. 1, the laminated structures comprise (a) Sealant layer (0.4 mil thick) comprising one of IPC1-7 or one of CPC1-2; (b) Core layer (1.2 mil thick) comprising 80 percent by weight of an ethylene-octene interpolymer having a density of 0.920 g/cm$^3$ and melt index $I_2$ of 1 g/10 minutes (commercially available under the trade name DOWLEX™ 2045 from The Dow Chemical Company) and 20 percent by weight of a low density polyethylene having a density of 0.923 g/cm$^3$ and melt index $I_2$ of 0.88 g/10 minutes (commercially available under the trade name DOW™ LDPE 611A from The Dow Chemical Company); (c) Skin layer (0.4 mil thick) comprising 80 percent by weight of an ethylene-octene interpolymer having a density of 0.920 g/cm$^3$ and melt index $I_2$ of 1 g/10 minutes (commercially available under the trade name DOWLEX™ 2045 from The Dow Chemical Company) and 20 percent by weight of a low density polyethylene having a density of 0.923 g/cm$^3$ and melt index $I_2$ of 0.88 g/10 minutes (commercially available under the trade name DOW™ LDPE 611A from The Dow Chemical Company); (d) an adhesive layer comprising a 2 component solvent based adhesive available under the trade name ADCOTE™ 577 from The Dow Chemical Company; and (e) a polyethylene terephthalate (PET) layer (0.5 mil thick).

Figure 2:
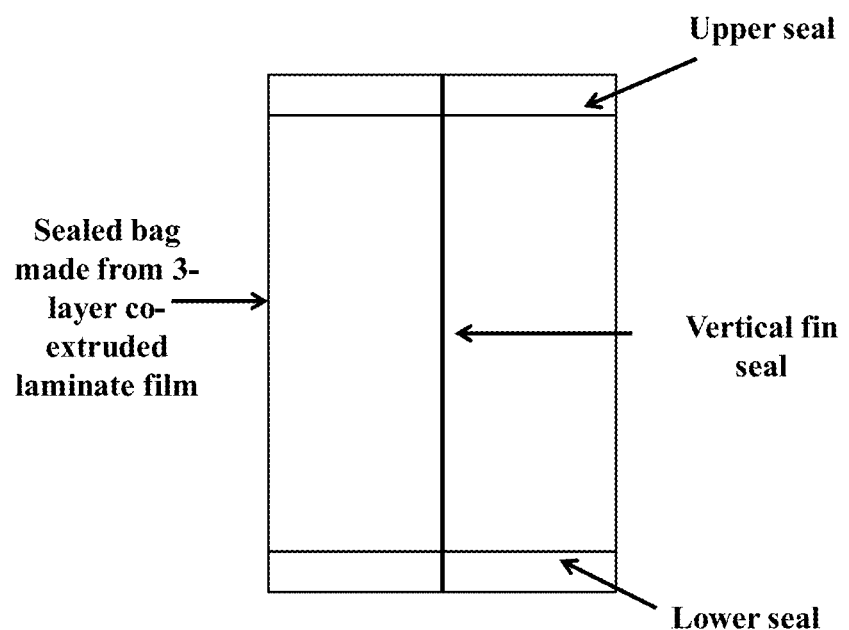
FIG. 2 illustrates an exemplary bag made from the exemplary three layer co-extruded laminate film structure of FIG. 1.
Figure 3A:
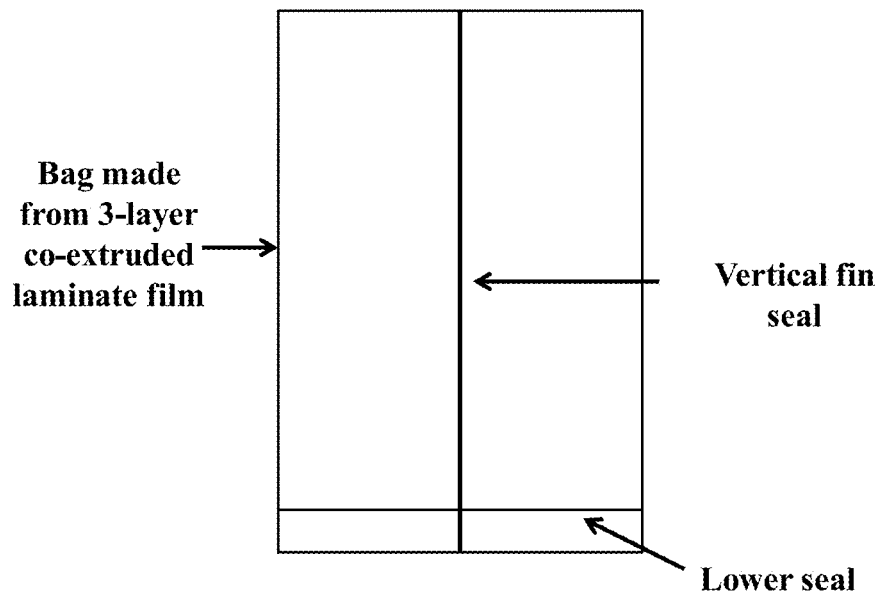
FIG. 3 illustrates an exemplary Vertical Form Fill Seal (VFFS) Packaging Process including the following stages: (a) Horizontal lower seal and vertical fin seal formation; (b) Bag filling step and (c) Upper seal formation.
Figure 3B:
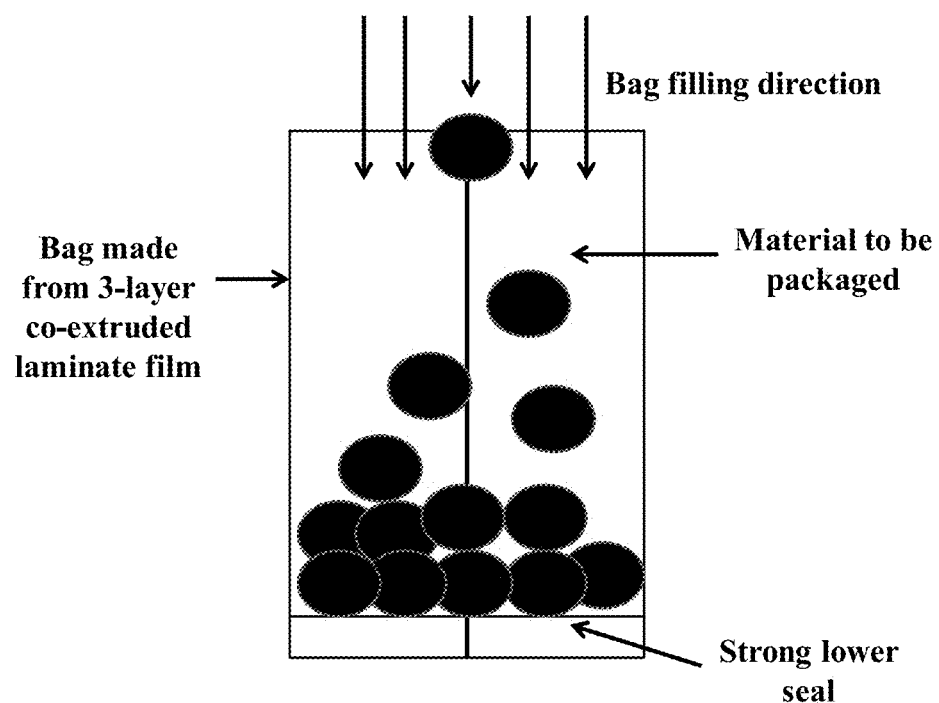
Figure 3C:
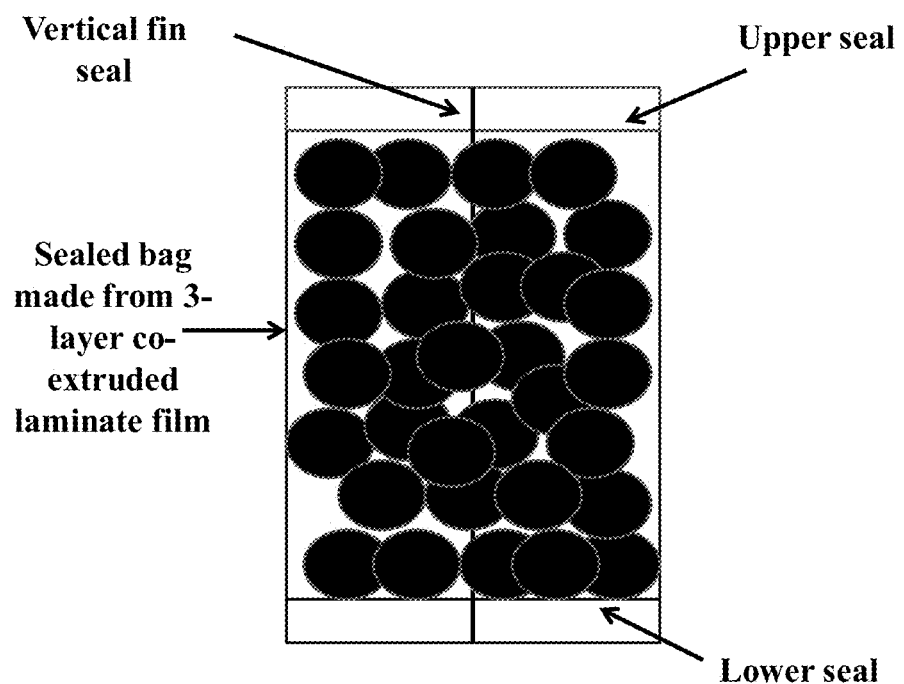

Inventive Laminated Structure (ILS) 1-7 and Comparative Laminated Structures (CLS) 1-2 were fabricated into inventive bags (IB) 1-7 and comparative bags (CB) 1-2 on the vertical form fill seal (VFFS) machine from Hayssen-Sandiarce Model Ultima ST 12-16 HP. The bag is illustrated in FIG. 2. The bag formation, filing, and sealing process is illustrated in FIG. 3.

The sealant layer integrity was tested by performing hermiticity tests on empty inventive bags 1-7 and comparative bags 1-2 and resistance to defect (moon) formation on filled inventive bags 1-7 and comparative bags 1-2. The inventive bag seals were found to have excellent hermiticity and resistance to defect formation.

Additional properties for Inventive monolayer blown films (IMBF) 1-7 and comparative monolayer blown films (CMBF) 1-2 were tested and the results are reported in Tables 6A and B.

Inventive Laminated Structure (ILS) 1-7 and Comparative Laminated Structures (CLS) 1-2 were tested to determine the properties of sealant layer in each laminated structure and the results are reported in Tables 6A and B.

TABLE 6A

| Properties | Test Methods | Units | CMBF1 | CMBF2 | IMBF1 | IMBF2 | IMBF 3 | IMBF 4 |
|---|---|---|---|---|---|---|---|---|
| 2% Sec Mod MD | ASTM D882 | psi | 15,291 | 12,001 | 18,400 | 20,993 | 17,367 | 17,999 |
| Dart B | ASTM D1709 | g | 392 | 924 | 856 | 852 | 556 | 776 |
| Norm. Elmendorf Tear MD | ASTM D1922 | g/mil | 190 | 203 | 203 | 208 | 207 | 207 |
| Total Haze | ASTM D1003 | % | 11.6 | 10.8 | 8 | 6 | 6 | 7 |

| | | | CLS1 | CLS2 | ILS1 | ILS2 | ILS3 | ILS4 |
|---|---|---|---|---|---|---|---|---|
| UHT Strength | ASTM F1921 | N/inch | 20.2 | 12.9 | 14.6 | 21.8 | 22.3 | 20.4 |
| Hot tack @130° C. | ASTM F1921 | N/inch | 18.5 | 10.7 | 14.6 | 21.8 | 22.3 | 20.4 |
| Hot tack @150° C. | ASTM F1921 | N/inch | 8.4 | 9.8 | 10.2 | 8.7 | 7.9 | 8 |
| Heat Seal Initiation Temp (HSIT) | ASTM E88 | ° C. | 85 | 85 | 95 | 95 | 95 | 95 |
| Ultimate Heat Seal Strength Temp (UHSST) | ASTM E88 | ° C. | 110 | 110 | 110 | 110 | 110 | 110 |
| Delta (UHSST - HSIT) | ASTM E88 | ° C. | 25 | 25 | 15 | 15 | 15 | 15 |

TABLE 6A-continued

|  |  | CB1 | CB2 | IB1 | IB2 | IB3 | IB4 |
|---|---|---|---|---|---|---|---|
| Defect formation min weight @ 250 ms & 180° C. | g | 1200 | 900 | 600 | 1100 | 1000 | 1100 |

TABLE 6B

| Properties | Test Methods | Units | IMBF5 | IMBF6 | IMBF7 |
|---|---|---|---|---|---|
| 2% Sec Mod MD | ASTM D882 | psi | 20,871 | 23,628 | 18,319 |
| Dart B | ASTM D1709 | g | 596 | 804 | 616 |
| Norm. Elmendorf Tear MD | ASTM D1922 | g/mil | 209 | 224 | 208 |
| Total Haze | ASTM D1003 | % | 10 | 14 | 6 |

| | | | ILS5 | ILS6 | ILS7 |
|---|---|---|---|---|---|
| UHT Strength | ASTM F1921 | N/inch | 19.1 | 19.7 | 18 |
| Hot tack @130° C. | ASTM F1921 | N/inch | 19.1 | 19.7 | 18 |
| Hot tack @150° C. | ASTM F1921 | N/inch | 8.4 | 9.8 | 7.8 |
| Heat Seal Initiation Temp (HSIT) | ASTM E88 | ° C. | 95 | 95 | 95 |
| Ultimate Heat Seal Strength Temp (UHSST) | ASTM E88 | ° C. | 110 | 110 | 110 |
| Delta (UHSST – HSIT) | ASTM E88 | ° C. | 15 | 15 | 15 |

| | | IB5 | IB6 | IB7 |
|---|---|---|---|---|
| Defect formation min weight @ 250 ms & 180° C. | g | 1100 | 1000 | 900 |

Test Methods

Test methods include the following:
Density Samples that are measured for density are prepared according to ASTM D4703.

Measurements are made within one hour of sample pressing using ASTM D792, Method B.

Melt Index

Melt index ($I_2$) is measured in accordance with ASTM D1238, Condition 190° C./2.16 kg, and is reported in grams eluted per 10 minutes. Melt flow rate ($I_{10}$) is measured in accordance with ASTM D1238, Condition 190° C./10 kg, and is reported in grams eluted per 10 minutes.

Differential Scanning Calorimetry (DSC)

DSC can be used to measure the melting and crystallization behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (~25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to –40° C. at a 10° C./minute cooling rate and held isothermal at –40° C. for 3 minutes. The sample is then heated to 150° C. (this is the "second heat" ramp) at a 10° C./minute heating rate. The cooling and second heating curves are recorded. The cool curve is analyzed by setting baseline endpoints from the beginning of crystallization to –20° C. The heat curve is analyzed by setting baseline endpoints from –20° C. to the end of melt. The values determined are peak melting temperature ($T_m$), peak crystallization temperature ($T_c$), heat of fusion ($H_f$) (in Joules per gram), and the calculated % crystallinity for samples using appropriate equation, for example for the ethylene/alpha-olefin interpolymer using Equation 1.

$$\% \text{ Crystallinity} = ((H_f)/(292 J/g)) \times 100 \qquad \text{Equation 1}$$

The heat of fusion ($H_f$) and the peak melting temperature are reported from the second heat curve. Peak crystallization temperature is determined from the cooling curve.

Dynamic Mechanical Spectroscopy (DMS) Frequency Sweep

Samples were compression-molded into 3 mm thick×25 mm diameter circular plaques at 177° C. for 5 minutes under 10 MPa pressure in air. The sample was then taken out of the press and placed on the counter to cool.

Constant temperature frequency sweep measurements were performed on an ARES strain controlled rheometer (TA Instruments) equipped with 25 mm parallel plates, under a nitrogen purge. For each measurement, the rheometer was thermally equilibrated for at least 30 minutes prior to zeroing the gap. The sample was placed on the plate and allowed to melt for five minutes at 190° C. The plates were then closed to 2 mm, the sample trimmed, and then the test was started. The method has an additional five minute delay built in, to allow for temperature equilibrium. The experiments were performed at 190° C. over a frequency range of 0.1-100 rad/s at five points per decade interval. The strain amplitude was constant at 10%. The stress response was analyzed in terms of amplitude and phase, from which the storage modulus (G'), loss modulus (G"), complex modulus (G*), dynamic complex viscosity (η*), and tan (6) or tan delta were calculated.

Conventional Gel Permeation Chromatography (GPC)

The GPC system consists of either a Polymer Laboratories Model PL-210 or a Polymer Laboratories Model PL-220 instrument equipped with a refractive index (RI) concentration detector. The column and carousel compartments are operated at 140° C. Three Polymer Laboratories 10-μm Mixed-B columns are used with the solvent 1,2,4-trichlorobenzene. The samples are prepared at a concentration of 0.1 g of polymer in 50 milliliters of solvent. The solvent used to prepare the samples contains 200 ppm of the antioxidant butylated hydroxytoluene (BHT). Samples are prepared by agitating lightly for four hours at 160° C. The injection volume used is 200 microliters and the flow rate is 1.0 ml/min. Calibration of the GPC column set is performed with twenty one narrow molecular weight distribution polystyrene standards purchased from Polymer Laboratories.

The polystyrene standard peak molecular weights (Mps) are converted to polyethylene molecular weight ($M_{PE}$) using Equation 1. The equation is described in Williams and Ward, J. Polym. Sci., Polym. Letters, 6, 621 (1968)):

$$M_{PE} = A \times (M_{ps})^B \qquad \text{Equation 1}$$

Where A has a value of 0.4316 and B is equal to 1.0.

A third order polynomial is determined to build the logarithmic molecular weight calibration as a function of elution volume.

Polyethylene equivalent molecular weight calculations were performed using PolymerChar "GPC One" software. The number average molecular weight (Mn), weight average molecular weight (Mw), and z-average molecular weight (Mz) was calculated by inputting the GPC results in equations 2 to 4:

$$\overline{Mn} = \frac{\sum_i RI_i}{\sum_i \left(\frac{RI_i}{M_{PE,i}}\right)} \qquad \text{Equation 2}$$

$$\overline{Mw} = \frac{\sum_i (RI_i * M_{PE,i})}{\sum_i RI_i} \qquad \text{Equation 3}$$

$$\overline{Mz} = \frac{\sum_i (RI_i * M_{PE,i}^2)}{\sum_i (RI_i * M_{PE,i})} \qquad \text{Equation 4}$$

Where $RI_i$ and $M_{PE,i}$ are the concentration detector baseline corrected response and conventional calibrated polyethylene molecular weight for the $i^{th}$ slice of the concentration response, elution volume paired data set. The precision of the weight-average molecular weight ΔMw is <2.6%.

The MWD is expressed as the weight average molecular weight (Mw) divided by the number average molecular weight (Mn).

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation.

CEF Method

Comonomer distribution analysis is performed with Crystallization Elution Fractionation (CEF) (PolymerChar in Spain, (B Monrabal et al, Macromol. Symp., 257, 71-79, 2007). Ortho-dichlorobenzene (ODCB) with 600 ppm antioxidant butylated hydroxytoluene (BHT) is used as solvent. Sample preparation is done with auto sampler at 160° C. for 2 hours under shaking at 4 mg/ml (unless otherwise specified). The injection volume is 300 μl. The temperature profile of CEF is: crystallization at 3° C./min from 110° C. to 30° C., the thermal equilibrium at 30° C. for 5 minutes, elution at 3° C./min from 30° C. to 140° C. The flow rate during crystallization is at 0.052 ml/min. The flow rate during elution is at 0.50 ml/min. The data is collected at one data point/second.

CEF column is packed by the Dow Chemical Company with glass beads at 125 μm±6% (MO-SCI Specialty Products) with ⅛ inch stainless tubing. Glass beads are acid washed by MO-SCI Specialty with the request from the Dow Chemical Company. Column volume is 2.06 ml. Column temperature calibration is performed by using a mixture of NIST Standard Reference Material Linear polyethylene 1475a (1.0 mg/ml), and Eicosane (2 mg/ml) in ODCB. Temperature is calibrated by adjusting elution heating rate so that NIST linear polyethylene 1475a has a peak temperature at 101.0° C., and Eicosane has a peak temperature of 30.0° C. The CEF column resolution is calculated with a mixture of NIST linear polyethylene 1475a (1.0 mg/ml) and hexacontane (Fluka, purum, ≥97.0%, 1 mg/ml). A baseline separation of hexacontane and NIST polyethylene 1475a is achieved. The area of hexacontane (from 35.0 to 67.0° C.) to the area of NIST 1475a from 67.0 to 110.0° C. is 50 to 50, the amount of soluble fraction below 35.0° C. is <1.8 wt %. The CEF column resolution is defined in equation 3, where the column resolution is 6.0.

$$\text{Resolution} = \frac{\text{Peak temperature of } NIST\ 1475a - \text{Peak Temperature of Hexacontane}}{\text{Half-height Width of } NIST\ 1475a + \text{Half-height Width of Hexacontane}} \qquad \text{Equation 3}$$

CDC Method

Comonomer distribution constant (CDC) is calculated from comonomer distribution profile by CEF. CDC is defined as Comonomer Distribution Index divided by Comonomer Distribution Shape Factor multiplying by 100 as shown in Equation 4.

$$CDC = \frac{\text{Comonomer Distrubution Index}}{\text{Comonomer Distribution Shape Factor}} = \frac{\text{Comonomer Distribution Index}}{\text{Half Width}/Stdev} * 100 \qquad \text{Equation 4}$$

Comonomer distribution index stands for the total weight fraction of polymer chains with the comonomer content ranging from 0.5 of median comonomer content ($C_{median}$) and 1.5 of $C_{median}$ from 35.0 to 119.0° C. Comonomer Distribution Shape Factor is defined as a ratio of the half width of comonomer distribution profile divided by the standard deviation of comonomer distribution profile from the peak temperature ($T_p$).

CDC is calculated from comonomer distribution profile by CEF, and CDC is defined as Comonomer Distribution Index divided by Comonomer Distribution Shape Factor multiplying by 100 as shown in Equation 4, and wherein Comonomer distribution index stands for the total weight fraction of polymer chains with the comonomer content ranging from 0.5 of median comonomer content ($C_{median}$) and 1.5 of $C_{median}$ from 35.0 to 119.0° C., and wherein Comonomer Distribution Shape Factor is defined as a ratio of the half width of comonomer distribution profile divided by the standard deviation of comonomer distribution profile from the peak temperature (Tp).

CDC is calculated according to the following steps:

(A) Obtain a weight fraction at each temperature (T) ($w_T(T)$) from 35.0° C. to 119.0° C. with a temperature step increase of 0.2° C. from CEF according to Equation 5.

$$\int_{35}^{119.0} w_T(T) dT = 1 \quad \text{Equation 5}$$

(B) Calculate the median temperature ($T_{median}$) at cumulative weight fraction of 0.500, according to Equation 6.

$$\int_{35}^{T_{median}} w_T(T) dT = 0.5 \quad \text{Equation 6}$$

(C) Calculate the corresponding median comonomer content in mole % ($C_{median}$) at the median temperature ($T_{median}$) by using comonomer content calibration curve according to Equation 7.

$$\ln(1 - comonomercontent) = -\frac{207.26}{273.12 + T} + 0.5533 \quad \text{Equation 7}$$
$$R^2 = 0.997$$

(D) Construct a comonomer content calibration curve by using a series of reference materials with known amount of comonomer content, i.e., eleven reference materials with narrow comonomer distribution (mono-modal comonomer distribution in CEF from 35.0 to 119.0° C.) with weight average Mw of 35,000 to 115,000 (measured via conventional GPC) at a comonomer content ranging from 0.0 mole % to 7.0 mole % are analyzed with CEF at the same experimental conditions specified in CEF experimental sections;

(E) Calculate comonomer content calibration by using the peak temperature ($T_p$) of each reference material and its comonomer content. The calibration is calculated from each reference material as shown in Equation 7 wherein: $R^2$ is the correlation constant.

(F) Calculate Comonomer Distribution Index from the total weight fraction with a comonomer content ranging from $0.5*C_{median}$ to $1.5*C_{median}$, and if $T_{median}$ is higher than 98.0° C., Comonomer Distribution Index is defined as 0.95.

(G) Obtain Maximum peak height from CEF comonomer distribution profile by searching each data point for the highest peak from 35.0° C. to 119.0° C. (if the two peaks are identical, then the lower temperature peak is selected); half width is defined as the temperature difference between the front temperature and the rear temperature at the half of the maximum peak height, the front temperature at the half of the maximum peak is searched forward from 35.0° C., while the rear temperature at the half of the maximum peak is searched backward from 119.0° C., in the case of a well defined bimodal distribution where the difference in the peak temperatures is equal to or greater than the 1.1 times of the sum of half width of each peak, the half width of the inventive ethylene-based polymer composition is calculated as the arithmetic average of the half width of each peak; and (H) Calculate the standard deviation of temperature (Stdev) according Equation 8

$$Stdev = \sqrt{\sum_{35.0}^{119.0} (T - T_p)^2 * w_T(T)} \quad \text{Equation 8}$$

Creep Zero Shear Viscosity Measurement Method

Zero-shear viscosities are obtained via creep tests that were conducted on an AR-G2 stress controlled rheometer (TA Instruments; New Castle, Del.) using 25-mm-diameter parallel plates at 190° C. The rheometer oven is set to test temperature for at least 30 minutes prior to zeroing fixtures. At the testing temperature a compression molded sample disk is inserted between the plates and allowed to come to equilibrium for 5 minutes. The upper plate is then lowered down to 50 μm above the desired testing gap (1.5 mm). Any superfluous material is trimmed off and the upper plate is lowered to the desired gap. Measurements are done under nitrogen purging at a flow rate of 5 L/min. Default creep time is set for 2 hours.

A constant low shear stress of 20 Pa is applied for all of the samples to ensure that the steady state shear rate is low enough to be in the Newtonian region. The resulting steady state shear rates are in the range of $10^{-3}$ to $10^{-4}$ $s^{-1}$ for the samples in this study. Steady state is determined by taking a linear regression for all the data in the last 10% time window of the plot of log (J(t)) vs. log(t), where J(t) is creep compliance and t is creep time. If the slope of the linear regression is greater than 0.97, steady state is considered to be reached, then the creep test is stopped. In all cases in this study the slope meets the criterion within 2 hours. The steady state shear rate is determined from the slope of the linear regression of all of the data points in the last 10% time window of the plot of ε vs. t, where ε is strain. The zero-shear viscosity is determined from the ratio of the applied stress to the steady state shear rate.

In order to determine if the sample is degraded during the creep test, a small amplitude oscillatory shear test is conducted before and after the creep test on the same specimen from 0.1 to 100 rad/s. The complex viscosity values of the two tests are compared. If the difference of the viscosity values at 0.1 rad/s is greater than 5%, the sample is considered to have degraded during the creep test, and the result is discarded.

Zero-Shear Viscosity Ratio (ZSVR) is defined as the ratio of the zero-shear viscosity (ZSV) of the branched polyethylene material to the ZSV of the linear polyethylene material at the equivalent weight average molecular weight (Mw-gpc) according to the following Equations 9 and 10:

$$ZSVR = \frac{\eta_{0B}}{\eta_{0L}} \quad \text{Equation 9}$$

-continued $$\eta_{0L} = 2.29 \times 10^{-15} M_{w\text{-}gpc}^{3.65}$$

The ZSV value is obtained from creep test at 190° C. via the method described above. The Mw-gpc value is determined by the conventional GPC method (Equation 3). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference—Society of Plastics Engineers (2008), 66th 887-891.

$^1$H NMR Method 3.26 g of stock solution is added to 0.133 g of polyolefin sample in 10 mm NMR tube. The stock solution is a mixture of tetrachloroethane-d$_2$ (TCE) and perchloroethylene (50:50, w:w) with 0.001M Cr$^{3+}$. The solution in the tube is purged with N$_2$ for 5 minutes to reduce the amount of oxygen. The capped sample tube is left at room temperature overnight to swell the polymer sample. The sample is dissolved at 110° C. with shaking. The samples are free of the additives that may contribute to unsaturation, e.g. slip agents such as erucamide.

The $^1$H NMR are run with a 10 mm cryoprobe at 120° C. on Bruker AVANCE 400 MHz spectrometer.

Two experiments are run to get the unsaturation: the control and the double presaturation experiments.

For the control experiment, the data is processed with exponential window function with LB=1 Hz, baseline was corrected from 7 to −2 ppm. The signal from residual $^1$H of TCE is set to 100, the integral I$_{total}$ from −0.5 to 3 ppm is used as the signal from whole polymer in the control experiment. The number of CH$_2$ group, NCH$_2$, in the polymer is calculated as following:

$$NCH_2 = I_{total}/2 \qquad \text{Equation 11}$$

Figure 6:
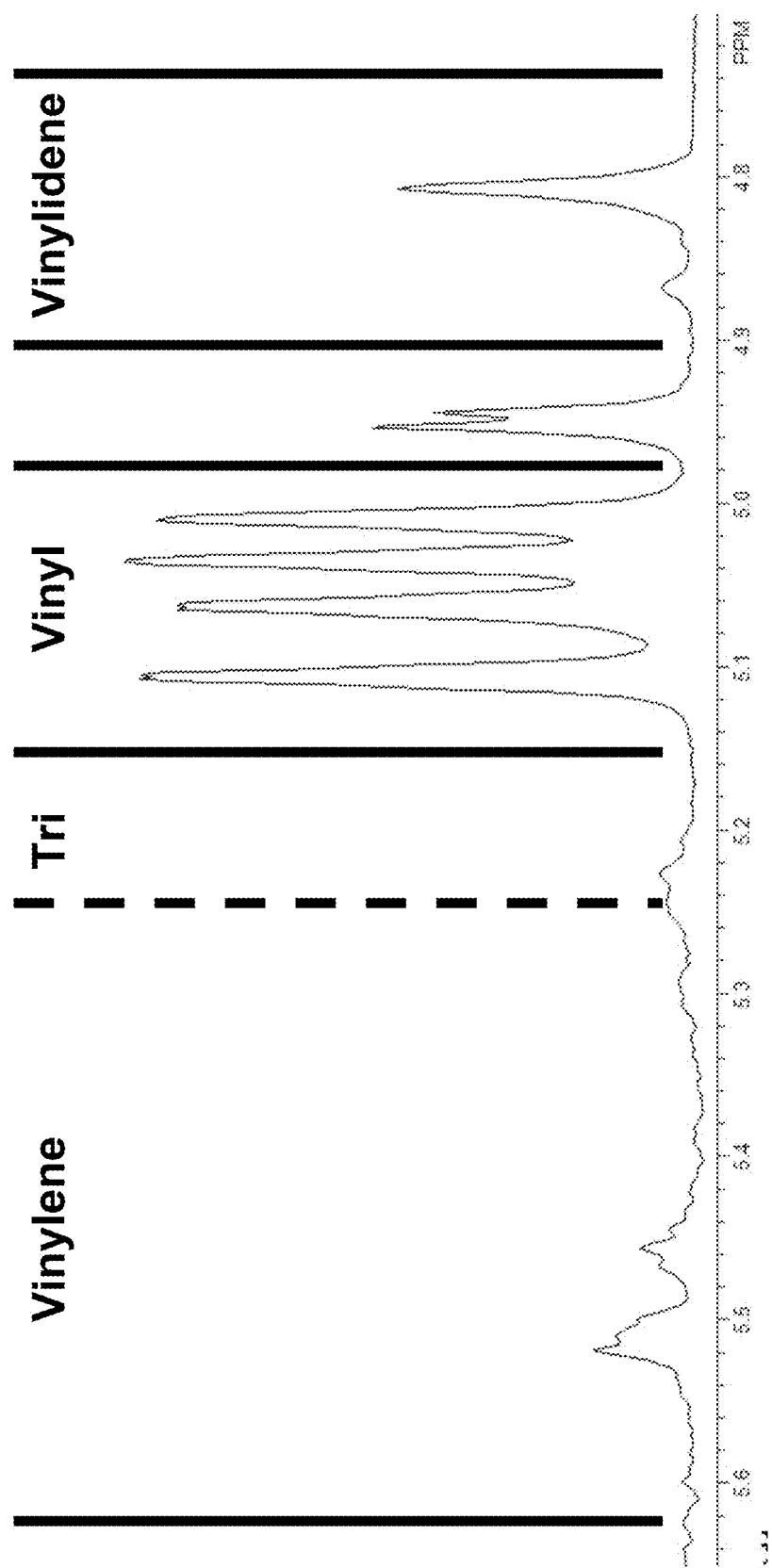
FIG. 6 shows $^1$H NMR spectral region integration limits for unsaturation determination, wherein the dash line means the position can be slightly different depending on the sample/catalyst.
Figure 8:
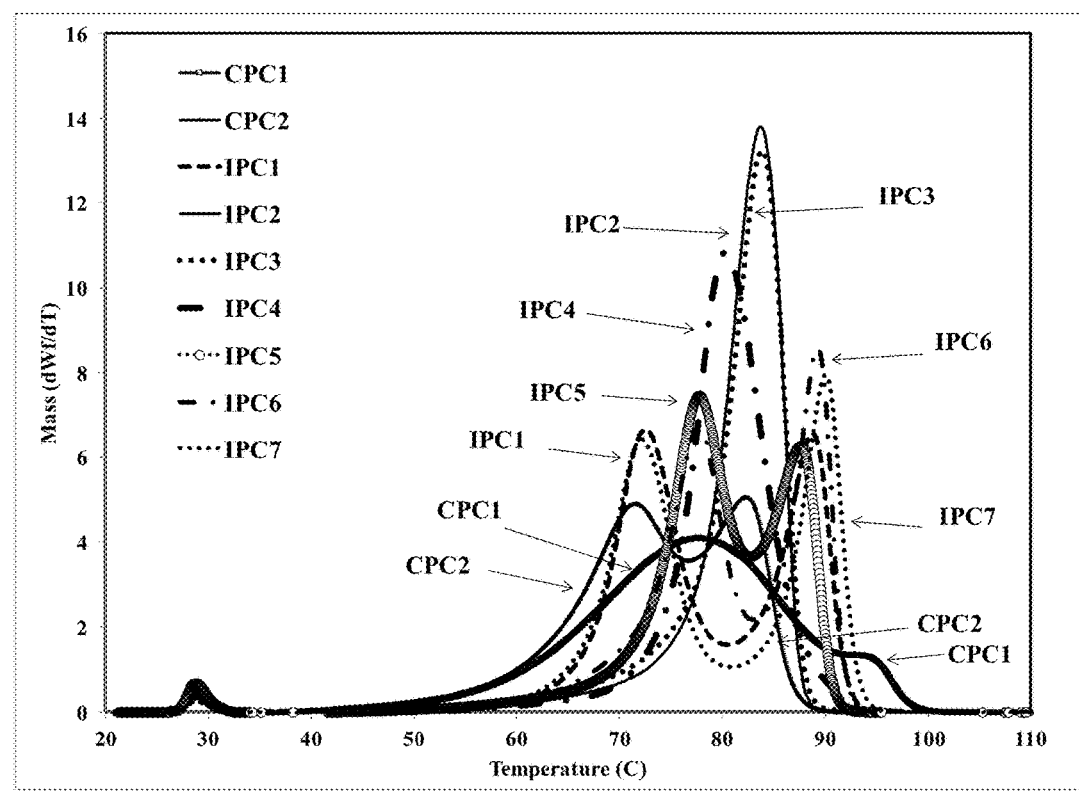
FIG. 8 is a graphical illustration of the CEF overlay of inventive and comparative polyolefin compositions.
Figure 9:
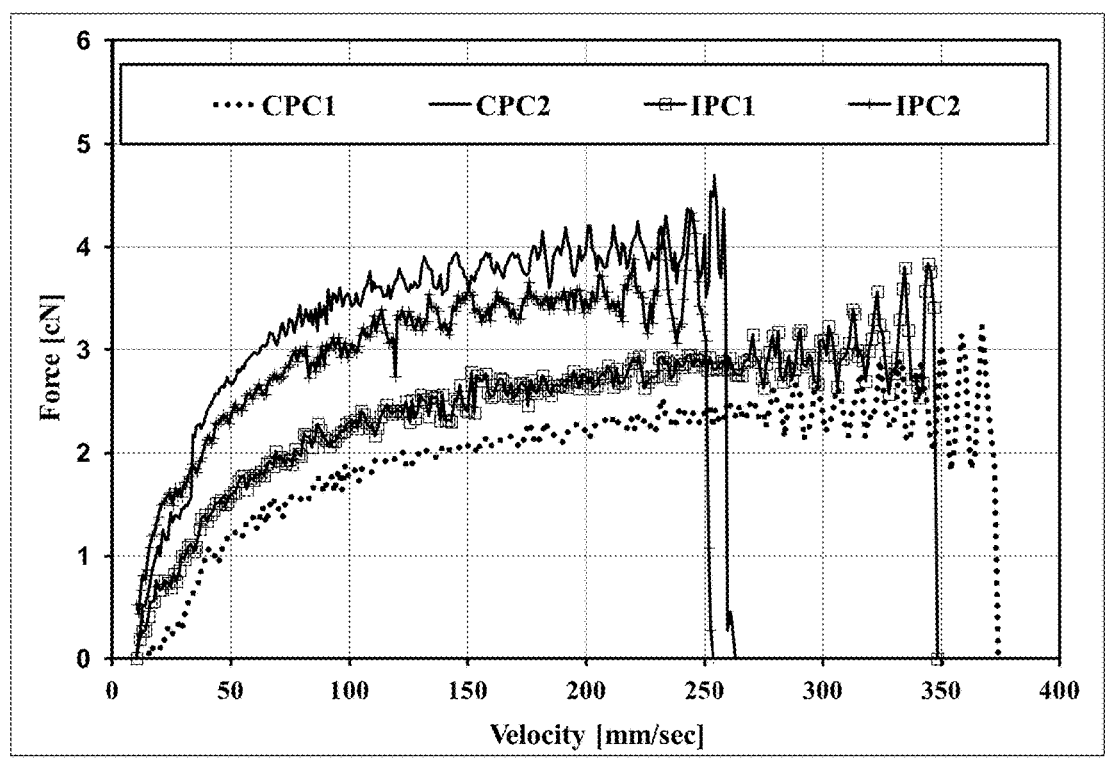
FIG. 9 is a graphical illustration of the melt strength overlay of inventive and comparative polyolefin compositions.

For the double presaturation experiment, the data is processed with exponential window function with LB=1 Hz, baseline was corrected from 6.6 to 4.5 ppm. The signal from residual $_1$H of TCE is set to 100, the corresponding integrals for unsaturations (I$_{vinylene}$, I$_{trisubstituted}$, I$_{vinyl}$ and I$_{vinylidene}$) were integrated based on the region shown in FIG. 6. The number of unsaturation unit for vinylene, trisubstituted, vinyl and vinylidene are calculated:

$$N_{vinylene} = I_{vinylene}/2 \qquad \text{Equation 12}$$

$$N_{trisubstituted} = I_{trisubstitute} \qquad \text{Equation 13}$$

$$N_{vinyl} = I_{vinyl}/2 \qquad \text{Equation 14}$$

$$N_{vinylidene} = I_{vinylidene}/2 \qquad \text{Equation 15}$$

The unsaturation unit/1,000 carbons are calculated as following:

$$N_{vinylene}/1,000C = (N_{vinylene}/NCH_2)*1,000 \qquad \text{Equation 16}$$

$$N_{trisubstituted}/1,000C = (N_{trisubstituted}/NCH_2)*1,000 \qquad \text{Equation 17}$$

$$N_{vinyl}/1,000C = (N_{vinyl}/NCH_2)*1,000 \qquad \text{Equation 18}$$

$$N_{vinylidene}/1,000C = (N_{vinylidene}/NCH_2)*1,000 \qquad \text{Equation 19}$$

The chemical shift reference is set at 6.0 ppm for the $^1$H signal from residual proton from TCT-d2. The control is run with ZG pulse, TD 32768, NS 4, DS 12, SWH 10,000 Hz, AQ 1.64 s, D1 14 s. The double presaturation experiment is run with a modified pulse sequence, O1P 1.354 ppm, O2P 0.960 ppm, PL9 57 db, PL21 70 db, TD 32768, NS 200, DS 4, SWH 10,000 Hz, AQ 1.64 s, D1 1 s, D13 13 s. The modified pulse sequences for unsaturation with Bruker AVANCE 400 MHz spectrometer are shown in FIG. 7.

$^{13}$C NMR Method

The samples were prepared by adding approximately 2.74 g of tetrachloroethane-d$_2$ containing 0.025 M Cr (AcAc)$_3$ to 0.2 g sample in a Norell 1001-7 10 mm NMR tube. Oxygen was removed by manually purging tubes with nitrogen using a Pasteur pipette for 1 minute. The samples were dissolved and homogenized by heating the tube and its contents to ~150° C. using a heating block with minimal use of heat gun. Each sample was visually inspected to ensure homogeneity. Samples were thoroughly mixed immediately prior to analysis, and were not allowed to cool before insertion into the heated NMR probe. This is necessary to ensure the sample is homogeneous and representative of the whole. The data were collected using a Bruker 400 MHz spectrometer equipped with a Bruker cryoprobe. The data were acquired using 160 scans, a 6 sec pulse repetition delay with a sample temperature of 120° C. All measurements were made on non-spinning samples in locked mode. Samples were allowed to thermally equilibrate for 7 minutes prior to data acquisition. The $^{13}$C NMR chemical shifts were internally referenced to the EEE triad at 30 ppm.

Melt Strength Measurement

The melt strength was measured at 190° C. on the Rheotens Model 71.97 Melt Strength Tester. The melt was produced by a Goettfert Rheotester 2000 capillary rheometer with a flat, 30/2 die, at a shear rate of 38.2 s$^{-1}$. The barrel of the rheometer (diameter: 12 mm) was filed in less than one minute. A delay of 10 minutes was allowed for proper melting. The take-up speed of the Rheotens wheels was varied, with a constant acceleration of 2.4 mm/sec$^2$. The tension in the drawn strand was monitored with time, until the strand broke. The steady-state force and the velocity at break were reported.

Monolayer Blown Film Tests

The following monolayer blown film properties were measured

Total Haze: Samples measured for internal haze and overall (total) haze are sampled and prepared according to ASTM D1003. Internal haze was obtained via refractive index matching using mineral oil on both sides of the films. A Hazeguard Plus (BYK-Gardner USA; Columbia, Md.) is used for testing. Surface haze is determined as the difference between total haze and internal haze.

45° Gloss: ASTM D2457

MD and CD Elmendorf Tear Strength: ASTM D1922

MD and CD Tensile Strength, 1% and 2% Secant Modulus: ASTM D882.

Dart Impact Strength: ASTM D1709

Laminate Film Tests

Hot Tack

Hot tack measurements on the film are performed using an Enepay commercial testing machines according to ASTM F1921 (Method B). Prior to testing the samples are conditioned for a minimum of 40 h at 23° C. and 50% R.H. (relative humidity) per ASTM D618 (Procedure A). The hot tack test simulates the filling of material into a pouch or bag before the seal has had a chance to cool completely.

Sheets of dimensions 8.5" by 14" are cut from the three-layer coextruded laminated film, with the longest dimension in the machine direction. Strips 1"wide and 14"long are cut from the film [samples need only be of sufficient length for clamping]. Tests are performed on these samples over a range of temperatures and the results reported as the maximum load as a function of temperature. In this case the hot tack measurement was carried out in the range 80° C. to 180° C. Typical temperature steps are 5° C. or 10° C. with 6 replicates performed at each temperature. The parameters used in the test are as follows:

Specimen Width: 25.4 mm (1.0 in)
Sealing Pressure: 0.275 N/mm$^2$
Sealing Dwell Time: 0.5 s
Delay time: 0.18 s
Peel speed: 200 mm/s The Enepay machines make 0.5 inch seals. The data are reported as a hot tack curve where Average hot tack force (N) is plotted as a function of Temperature. The hot tack initiation temperature is the temperature required to achieve a pre-defined minimum hot tack force. This force is typically in the 1-2 N range, but will vary depending on the specific application. The ultimate hot tack strength is the peak in the hot tack curve. The hot tack range is the range in temperature at which the seal strength exceeds the Minimum Hot Tack Force.

Heat Seal

Heat Seal measurements on the film are performed on a commercial tensile testing machine according to ASTM F88 (Technique A). The Heat Seal test is a gauge of the strength of seals (Seal Strength) in flexible barrier materials. It does this by measuring the force required to separate a test strip of material containing the seal and identifies the mode of specimen failure. Seal Strength is relevant to the opening force and package integrity.

Prior to cutting, the films are conditioned for a minimum of 40 h at 23° C. (±2° C.) and 50% (±5%) R.H., per ASTM D618 (procedure A). Sheets are then cut from the three-layer coextruded laminated film in the machine direction to a length of approximately 11 inches and a width of approximately 8.5 inches. The sheets are heat sealed across the machine direction on a Kopp Heat Sealer over a range of temperatures under the following conditions:

Sealing Pressure: 0.275 N/mm$^2$
Sealing Dwell Time: 0.5 s

The temperature range is approximately given by the Hot Tack Range (i.e. the temperature range over which at least a minimum hot tack seal is achieved and prior to the burn-through temperature). In this case the heat seal measurement was carried out in the range 80° C. to 140° C.

The sealed sheets are conditioned for a minimum of 3 hours at 23° (±2° C.) and 50% R.H (±5%) prior to cutting into one inch wide strips. These strips are then further conditioned for a minimum of 21 hours at 23° (±2° C.) and 50% R.H (±5%) prior to testing.

For testing, the strips are loaded into the grips of a tensile testing machine at an initial separation of 2 inches mm and pulled at a grip separation rate of 10 inches/min at 23° (±2° C.) and 50% R.H (±5%). The strips are tested unsupported. Six replicate tests are performed for each sealing temperature.

The data are reported as the peak load; strain at peak load and failure mode as a function of temperature. The Heat Seal Initiation Temperature (HSIT) is defined as the temperature at seal strength of 1 lb/in. The Ultimate Heat Seal Strength Temperature (UHSST) is defined as the temperature corresponding to the maximum seal strength.

Hermetic Seal Test

Bags fabricated from the laminate films were tested for hermiticity under 12"vacuum on the Visual Check International Model H seal integrity tester. The bags were fabricated on the Hayssen-Sandiarce Model Ultima ST 12-16 HP VFFS machine. The bag dimension was: length 9.84 inch, width 11 inch. A minimum of ten empty, sealed bags were tested per inventive and comparative sample. An empty bag is defined as containing no solid packaged material. The bags were placed inside the tester tank filled with water, and pushed down into the water by the lid of the tester. A vacuum was applied to create air pressure inside the bag. If the seal leaked, the air escaped from the bag and created bubbles in the water.

Percent hermeticity is calculated as follows:

% hermeticity=100*(bags without leakers/total number of bags)

Resistance to Defect (Moon) Formation

Figure 4:
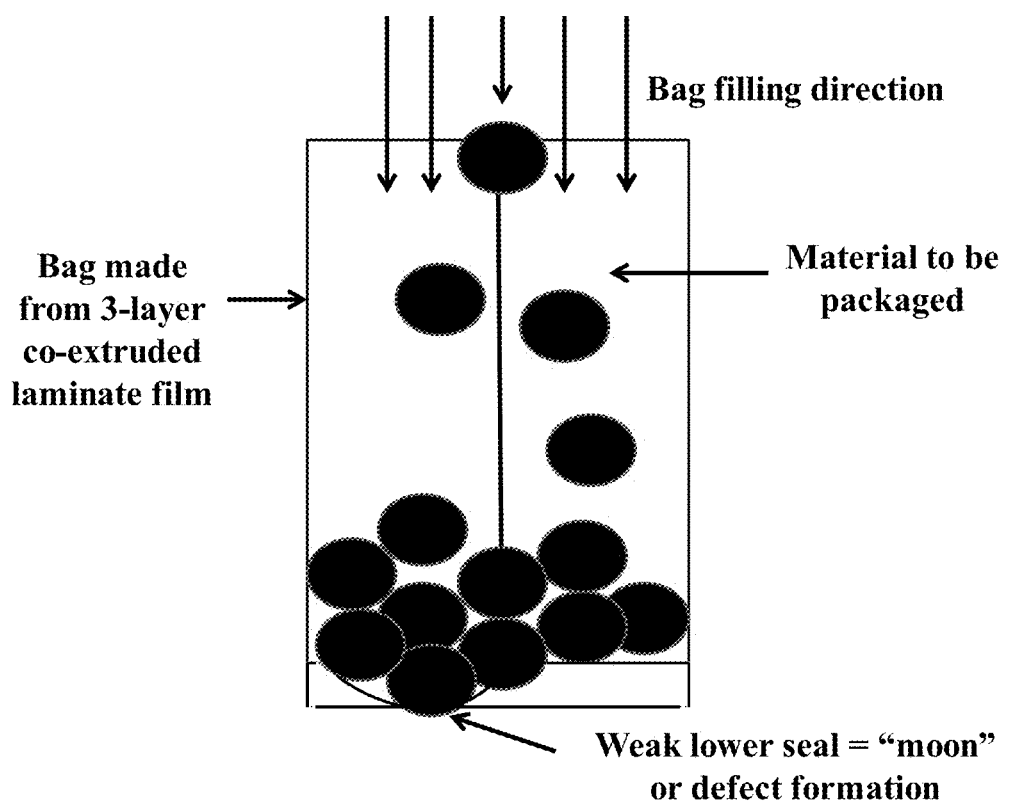
FIG. 4 illustrates an exemplary defect "moon" formation in a vertical form fill seal bag.
Figure 5:
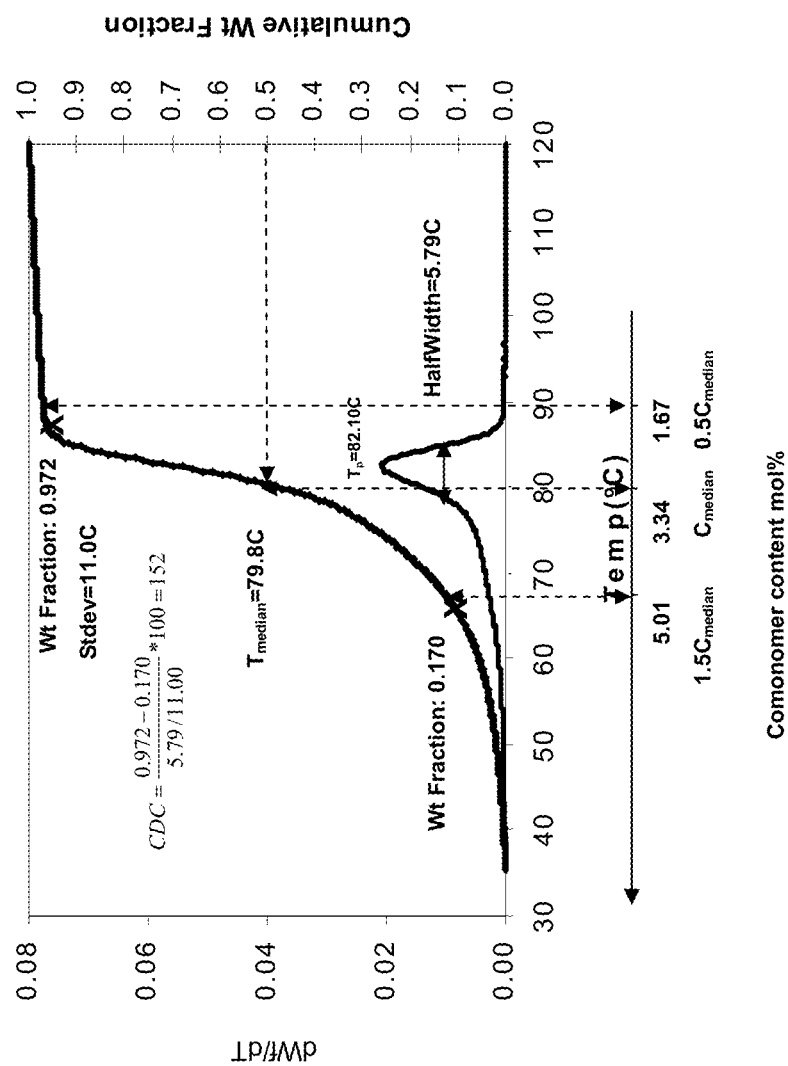
FIG. 5 is a graphical illustration of Comonomer Distribution Constant (CDC) calculation obtaining peak temperature half width and median temperature from Crystallization Elution Fractionation (CEF), showing comonomer distribution profile of an ethylene/α-olefin interpolymer composition.

The seal opening, while the seal is still hot, due to packaged content weight, was tested by performing the defect (moon formation) test on filled bags. An example of moon formation is given in FIG. 4. The bags were fabricated on the Hayssen-Sandiarce Model Ultima ST 12-16 HP VFFS machine. The jaw temperature was maintained at 180° C. and the sealing dwell time was 250 milli seconds. Weights, in the range from 100 g to 1500 g, were added to the bag. The weight was dropped in the bag as soon as the VFFS seal jaws opened after formation of the bottom seal. A minimum of ten filled sealed bags were tested per inventive and comparative sample. The bags were visually inspected for moon formation or seal opening at the bottom seal. The numbers of bags with and without moon formation were recorded. The minimum weight required to cause bottom seal failure in 20% of the bags was reported as the minimum weight required for defect formation.

The present invention may be embodied in other forms without departing from the spirit and the essential attributes thereof, and, accordingly, reference should be made to the appended claims, rather than to the foregoing specification, as indicating the scope of the invention.

We claim:

1. A multilayer structure comprising:
   one or more film layers comprising a sealant composition comprising a polyolefin composition suitable for sealant applications comprising an ethylene/α-olefin interpolymer composition having a Comonomer Distribution Constant (CDC) in the range of from 40 to 110, vinyl unsaturation of less than 0.1 vinyls per one thousand carbon atoms present in the backbone of the ethylene-based polymer composition; a zero shear viscosity ratio (ZSVR) in the range of from 1.01 to 2.0; a density in the range of from 0.908 to 0.922 g/cm$^3$, a melt index ($I_2$ at 190° C. /2.16 kg) in a range of from 0.5 to 5.0 g/10 minutes, a molecular weight distribution ($M_w/M_n$) in the range of from 2.0 to 4.0, and tan delta at 0.1 radian/second and 190° C. in the range of from 5 to 50; and
   one or more layers selected from the group consisting of one or more polyamides, one or more polyesters, one or more polyolefins different from the sealant composition and combinations thereof.

2. The multilayer structure of claim 1, wherein the sealant composition further comprises one or more ethylene polymers, or one or more propylene based polymers, or combinations thereof.

3. A food packaging device comprising the multilayer structure of claim 1.

4. The multilayer structure of claim 1, comprising a three-layer coextruded blown film comprising the one or more film layers of the sealant composition.

5. The multilayer structure of claim 4, comprising a laminate of the three-layer coextruded blown film and a polymer substrate.

6. The multilayer structure of claim 5, wherein the polymer substrate comprises a polyethylene terephthalate (PET).

\* \* \* \* \*